(12) United States Patent
Schnakenberg

(10) Patent No.: US 11,600,877 B2
(45) Date of Patent: *Mar. 7, 2023

(54) ACCUMULATOR MODULE HAVING OPTIMIZED HEAT DISSIPATION

(71) Applicant: COMMEO GMBH, Wallenhorst (DE)

(72) Inventor: Michael Schnakenberg, Wallenhorst (DE)

(73) Assignee: COMMEO GmbH, Wallenhorst (DE)

( * ) Notice: Subject to any disclaimer, the term of this patent is extended or adjusted under 35 U.S.C. 154(b) by 327 days.

This patent is subject to a terminal disclaimer.

(21) Appl. No.: 16/310,813

(22) PCT Filed: Jun. 19, 2017

(86) PCT No.: PCT/EP2017/064982
§ 371 (c)(1),
(2) Date: Dec. 17, 2018

(87) PCT Pub. No.: WO2017/220514
PCT Pub. Date: Dec. 28, 2017

(65) Prior Publication Data
US 2020/0313259 A1 Oct. 1, 2020

(30) Foreign Application Priority Data
Jun. 20, 2016 (DE) .................. 20 2016 103 251.2

(51) Int. Cl.
*H01M 10/00* (2006.01)
*H01M 50/20* (2021.01)
(Continued)

(52) U.S. Cl.
CPC ......... *H01M 50/20* (2021.01); *H01M 10/613* (2015.04); *H01M 10/653* (2015.04);
(Continued)

(58) Field of Classification Search
CPC ...... H01M 2/1077; H01M 2/10; H01M 2/206; H01M 2/202; H01M 2/20; H01M 2/204;
(Continued)

(56) References Cited

U.S. PATENT DOCUMENTS 9,299,500 B2  3/2016  Watanabe
9,559,394 B2  1/2017  Eckl et al.
(Continued)

FOREIGN PATENT DOCUMENTS

CN    103026437        4/2013
DE    102008059957 A1 * 6/2010 ............ H01M 2/105
(Continued)

OTHER PUBLICATIONS

Machine translation of DE102008059957 originally published to Lamm et al. on Jun. 10, 2010. (Year: 2010).*

(Continued)

*Primary Examiner* — Nicholas P D'Aniello
(74) *Attorney, Agent, or Firm* — Liu & Liu

(57) ABSTRACT

The invention relates to an accumulator module (10) having optimized heat dissipation, namely, an accumulator module (10) having at least one carrier (18) that is placeable in the interior of a housing (12) of the accumulator module (10) and providable with a plurality of accumulator cells (14), wherein each accumulator cell (14) in the carrier (18) is electrically contacted solely from one side, and wherein the or each carrier (18) that is equipped with accumulator cells (14) is placeable in the interior of the housing (12) in a form that thermally couples the free end faces of the accumulator cells (14) to the housing (12).

17 Claims, 15 Drawing Sheets

(51) Int. Cl.
- *H01M 10/613* (2014.01)
- *H01M 10/653* (2014.01)
- *H01M 10/6551* (2014.01)
- *H01M 10/6556* (2014.01)
- *H01M 10/6567* (2014.01)
- *H01M 10/656* (2014.01)
- *H01M 50/502* (2021.01)

(52) U.S. Cl.
CPC ..... *H01M 10/656* (2015.04); *H01M 10/6551* (2015.04); *H01M 10/6556* (2015.04); *H01M 10/6567* (2015.04); *H01M 50/502* (2021.01)

(58) Field of Classification Search
CPC ............ H01M 10/613; H01M 10/653; H01M 10/6551; H01M 10/6556; H01M 10/656; H01M 50/20; H01M 50/5002; H01M 50/505; H01M 50/107; H01M 50/152; H01M 50/179; H01M 50/213; H01M 50/559; H01M 10/6567; H01M 10/123; H01M 10/283; H01M 10/643
See application file for complete search history.

(56) References Cited

U.S. PATENT DOCUMENTS

| | | |
|---|---|---|
| 2005/0208375 A1 | 9/2005 | Sakurai |
| 2006/0177734 A1* | 8/2006 | Yao .............. H01R 31/085 429/160 |
| 2011/0177368 A1* | 7/2011 | Maguire ............ H01M 50/502 429/90 |
| 2012/0015235 A1* | 1/2012 | Fuhr ................. H01M 2/305 429/158 |
| 2012/0164490 A1* | 6/2012 | Itoi ................. H01M 10/6566 429/7 |
| 2013/0011719 A1 | 1/2013 | Yasui et al. |
| 2014/0178723 A1* | 6/2014 | Tsujioka .......... H01M 50/213 429/99 |
| 2014/0234668 A1* | 8/2014 | Sweney ............. H01M 50/24 429/7 |
| 2014/0234687 A1 | 8/2014 | Fuhr et al. |
| 2015/0118530 A1* | 4/2015 | Lee .................. H01M 10/482 429/82 |
| 2016/0301038 A1 | 10/2016 | Modest et al. |

FOREIGN PATENT DOCUMENTS

| | | |
|---|---|---|
| DE | 102012213273 | 2/2014 |
| DE | 102013008641 | 11/2014 |
| DE | 102014209444 | 11/2015 |
| DE | 102014114022 | 3/2016 |
| EP | 1689009 | 8/2006 |
| WO | 2010085636 | 7/2010 |
| WO | 2015042295 | 3/2015 |

OTHER PUBLICATIONS

International Search Report of Counterpart PCT International Application No. PCT/EP2017/064979.
International Search Report of Counterpart PCT International Application No. PCT/EP2017/064982.
International Search Report of Counterpart PCT International Application No. PCT/EP2017/064983.

* cited by examiner

ACCUMULATOR MODULE HAVING OPTIMIZED HEAT DISSIPATION

BACKGROUND OF THE INVENTION

1. Field of the Invention

The invention relates in general to a device, basically known per se, for storing electrical energy and for contacting energy storage cells included in the device, i.e., a device that functions as an energy store (energy storage device).

2. Description of Related Art

DE 10 2012 213 273 A1 describes an energy storage device for a vehicle. Energy storage devices are generally used for a mobile power supply, for an emergency power supply, and the like.

SUMMARY OF THE INVENTION

The object of the present invention is to provide an energy storage device, referred to below as an accumulator module, having optimized heat dissipation for accumulator cells included in the accumulator module.

In summary, the invention proposes a novel type of heat dissipation in accumulator units, referred to below as accumulator cells (the so-called secondary cells that function as energy storage cells), in particular accumulator cells in the form of round cells, and in one particular embodiment, optionally combinable therewith, a novel way of efficiently conducting current from an accumulator cell included in the accumulator module, in particular an accumulator cell in the form of a round cell, or a group of such accumulator cells.

This is achieved in that the cell contacting, namely, electrically conductive cell contacting for the current conduction from and/or to the particular accumulator cell, takes place solely from one side. The opposite side is therefore available strictly for heat dissipation. The heat may thus be transported on or to a cooling surface or the like over the shortest path. The accumulator cells are held in position by a cell holder that functions as a carrier.

The above-mentioned object is achieved according to the invention by means of an accumulator module that functions as an energy storage device, having the features of claim 1. In such an accumulator module, at least one carrier that is providable with a plurality of accumulator cells is placeable in the interior of a housing of the accumulator module, and in an operationally ready accumulator module, at least one carrier that is provided with a plurality of accumulator cells is placed in the interior of the housing of the accumulator module. Each accumulator cell in the carrier is electrically contacted solely from one side, and the or each carrier equipped with accumulator cells is placeable in the interior of the housing of the accumulator module in a form that thermally couples the free end faces of the accumulator cells to a cooling element, for example at a side surface of the housing that functions as a cooling element. The housing then functions as a cooling element, for example. The housing or the side surface of the housing in question absorbs the thermal energy dissipated from the accumulator cells and releases it to the surroundings via convection, for example. Additionally or alternatively, targeted heating of the accumulator cells may also take place via the housing or the side surface of the housing in question.

The special feature of the accumulator module proposed here lies in the combination of the accumulator cells in the carrier that are contacted solely from one side. As is known, it is common for accumulator cells, whose outer surfaces function as poles, to be contacted at both ends, and for accumulator cells in the form of round cells, for example, to be contacted at both of their end sides/end faces. The electrical contacting of the accumulator cells solely from one side, sometimes also referred to below only as "one-side contacting" for short, allows a particularly space-saving shape of the electrically conductive connection of a plurality of accumulator cells, and since provision of conductor tracks from one end of an accumulator cell to the area of the opposite end is not necessary, also allows a high packing density of a plurality of accumulator cells, which according to the approach proposed here are combined in an accumulator module. In addition, the short conductor paths and few material transitions result in only minor power loss. However, as a result of the one-side contacting and the combination of the accumulator cells that is thus possible, all accumulator cells of a carrier are placeable in the above-described manner.

The stated one-side contacting does not necessarily refer just to a single geometric outer surface of the/round cell in question. Rather, the one-side contacting refers to one of the oppositely situated ends of the accumulator cell/round cell in question along a longitudinal axis of the accumulator cell/round cell. For a cylindrical accumulator cell (round cell) or an accumulator cell having the geometric shape of a regular cylinder, the one-side contacting in principle may thus be limited to the cover surface or base surface of the round cell, in that, for example, concentric sections of the cover surface or base surface function as poles. However, the one-side contacting may also refer to the cover surface or base surface as well as a section of the cylindrical surface on the cover side or the base side, in that on the one hand a section of the cover surface or base surface, and on the other hand a cover-side or base-side section of the circumferential surface, function as poles. A cover-side section of the circumferential surface of an accumulator cell is a surface section that adjoins the cover surface; correspondingly, a base-side section of the circumferential surface of an accumulator cell is a surface section that adjoins the base surface. However, contacting of the cover surface on the one hand and of the base surface on the other hand is not one-side contacting. Similarly, contacting of the cover surface and of a base-side section of the circumferential surface or contacting of the base surface and of a cover-side section of the circumferential surface is not one-side contacting.

Advantageous embodiments of the invention are the subject matter of the subclaims. Back-references that are used within the claims refer to the further development of the subject matter of the referenced claim by the features of the respective dependent claim. They are not to be construed as a waiver of the attainment of independent subject matter protection for the features or feature combinations of a dependent claim. Furthermore, with regard to an interpretation of the claims and an interpretation of the description, in the event of a more precise specification of a feature in a dependent claim, it is to be assumed that there is no such limitation in the respective preceding claims or in a more general embodiment of the accumulator module in question. Accordingly, any reference in the description to aspects of dependent claims, even without being specifically mentioned, is also to be explicitly construed as a description of optional features. Furthermore, it is pointed out that the claims filed with the present patent application are proposed formulations without prejudice to the attainment of further patent protection. Since in particular the features of the dependent claims, with regard to the prior art on the date of priority, may form separate, independent inventions, the applicant reserves the right to make these or even further feature combinations, heretofore disclosed only in the description and/or drawings, the subject matter of independent claims or declarations of division. Moreover, the features of the dependent claims may also include separate inventions that are independent from the subject matter of the respective referenced claims.

In one embodiment of the accumulator module, the free ends of the accumulator cells that are electrically contacted solely from one side protrude beyond the carrier and point in the same direction, and the free end faces of the accumulator cells are situated in one plane or at least essentially in one plane. Due to the fact that the free ends of the accumulator cells that are electrically contacted solely from one side protrude beyond the carrier and all point in the same direction, and the free end faces of the accumulator cells are situated in one plane or at least essentially in one plane, this results, in a manner of speaking, in an end face plane that may be directly or indirectly brought into contact with a cooling element or with the housing of the accumulator module that then functions as a cooling element. The end face plane ensures that all accumulator cells of a carrier take part in the heating (or the heat dissipation).

In one special embodiment of the accumulator module, two carriers equipped with accumulator cells are fixable in the housing of the accumulator module by means of at least one spacer piece; as a result of this fixing, the free end faces of the accumulator cells placed in the carriers for heat dissipation rest against the housing, at the inner surface of the housing. Thus, the at least one spacer piece on the one hand brings about the fixing of the carriers in the housing, and on the other hand, the thermal coupling of the accumulator cells to the housing. The at least one spacer piece spreads apart the two carriers in the housing, and presses the accumulator cells placed in the carriers against the inner surface of the housing.

In another embodiment of the accumulator module, the accumulator module has an insulator between the free end faces of the accumulator cells and an inner surface of the housing; for the thermal coupling of the end faces of the accumulator cells to the housing, the free end faces of the accumulator cells rest against the insulator, and the insulator in turn is connected to the inner surface of the housing, for example by adhesive bonding. The free end faces of the accumulator cells form the base of a cup which largely encloses the accumulator cells and which at the opposite end is closed by a further end face with an end face-side contact at that location. Thus, the free end faces, the same as the circumferential surface of the accumulator cells, represents one of the poles thereof. In an electrically conductive housing, direct contact with the inner surface of the housing would electroconductively contact all of these poles. Accordingly, for an accumulator module having an electrically conductive housing, an insulator is provided between the free end faces of the accumulator cells and the inner surface of the housing thermally contacted by same. A metallic housing, for example, may then also be used for the accumulator module. For example, an insulator in the form of an insulator film that is applied, in particular adhesively bonded, to the inner surface of the or each thermally contacted lateral surface of the housing is suitable as an insulator.

In yet another embodiment of the accumulator module, each accumulator cell in the carrier is individually axially resiliently supported. This individual resilient support ensures that when accumulator cells in their entirety are pressed against a cooling element or an inner surface of the housing, tolerance compensation is possible, thus ensuring that each individual accumulator cell with its free end face rests against the particular surface (cooling element, housing).

In one special embodiment of an accumulator module with individually axially resiliently supported accumulator cells, a/each carrier includes a plurality of uniformly spaced cell connectors oriented in parallel to one another, wherein each accumulator cell in the carrier is individually axially resiliently supported, in that resilient contact tongues of one cell connector and contact tabs of another cell connector in each case contact an accumulator cell. In this embodiment, special electrically conductive cell connectors function as contacting means for strictly one-side electrical contacting of the accumulator cells, and on the one hand contact an end face-side contact, in particular a center contact, of at least one accumulator cell, or contact the end face-side contacts, in particular the center contacts, of all accumulator cells of a group of accumulator cells, and on the other hand contact a circumferential surface of at least one accumulator cell or the circumferential surfaces of all accumulator cells of a group of accumulator cells. This is one possible embodiment, and in the approach proposed here is the preferred embodiment, for electrically contacting the accumulator cells from only one side, with detachability in particular without tools. The contacting takes place from the cover surface of an accumulator cell/round cell and an end face-side contact, present there, to a side surface of another accumulator cell/round cell, or conversely.

The description is continued below, based on center contacts as end face-side contacts of the accumulator cells. Any time that a center contact is mentioned, this is nevertheless always to be construed as the more general specification as an end face-side contact.

In another embodiment of an accumulator module according to the invention, each cell connector is characterized by an elongated shape, and along its longitudinal extension contacts the center contacts of multiple accumulator cells as well as the circumferential surfaces of multiple further accumulator cells. In addition, such an elongated cell connector has resilient contact tongues for contacting the center contacts, and optionally likewise has resilient contact tabs for contacting the circumferential surfaces of contact tabs. Due to the elongated shape, each cell connector can contact multiple accumulator cells, namely, multiple accumulator cells in a row. Cross wiring, which is necessary without such an elongated shape, is therefore dispensed with. This saves space, results in a reduced number of material transitions and thus, reduced power loss, and lastly, simplifies the installation of an accumulator module. As a result of the resilient contact tongues, tolerance compensation is provided, and secure electrically conductive contacting of the accumulator cells, in particular simultaneous secure electrically conductive contacting of multiple accumulator cells, is ensured.

In one special embodiment of the accumulator module according to the invention, it is provided that each cell connector in a stepped profile includes a horizontal section, at least one adjoining vertical or at least essentially vertical section, optionally multiple vertical sections uniformly spaced along the longitudinal extension of the cell connector, and at least one adjoining lateral section or multiple lateral sections that in each case adjoin a vertical section, and that the contact tongues are part of the horizontal section, and the contact tabs are part of the lateral section or the lateral sections. Due to the stepped profile, a cell connector on the one hand may contact a plurality of accumulator cells on their cover sides, and on the other hand may contact a plurality of further accumulator cells on their circumferential surfaces, so that the above-mentioned one-side contacting results for a plurality of accumulator cells.

In yet another embodiment of the accumulator module according to the invention, the accumulator cells included therein have in their circumferential surfaces a constriction in the form of a groove (elongated depression) that circumferentially extends completely or at least in sections in the circumferential direction, and for electrically conductive contacting of the accumulator cells, the contact tabs of the cell connectors engage with the constrictions in the accumulator cells. The contact tabs that engage with such constrictions are oriented transversely or essentially transversely with respect to the center longitudinal axis of the accumulator cells. The contact tabs engaging with the constrictions consequently fix the accumulator cells in the axial direction. The contacting of the accumulator cells that results during the engagement with the constrictions thus fulfills a double function. On the one hand, secure electrically conductive contacting results. On the other hand, mechanical contacting results, which brings about axial fixing of the accumulator cells.

In one embodiment of an accumulator module in which electrically conductive contacting and axial fixing of the accumulator cells take place by means of contact tabs that engage with constrictions in the circumferential surfaces of the accumulator cells, a/each accumulator cell placed in the carrier is releasably lockable in the carrier via the or each contact tab that engages with the constriction. For this purpose, each cell connector is connected to the carrier, at least in sections, for example by fixing the cell connector in or on the carrier. The locking of an accumulator cell takes place via the engagement of at least one contact tab with the constriction in the accumulator cell. The lock may be released when the or each contact tab is disengaged from the constriction.

In another embodiment of an accumulator module in which electrically conductive contacting and axial fixing take place by means of contact tabs that engage with constrictions in the circumferential surfaces of the accumulator cells, a/each accumulator cell placed in the carrier is clampable by the two cell connectors by means of the or each contact tongue of a cell connector that contacts the center contact of the accumulator cell, and by means of the or each contact tab of a further cell connector that engage with the constriction, and in the inserted state is clamped by the two cell connectors and the contact tongues or contact tabs. As a result of this clamping, each accumulator cell is held only, or at least essentially, by the cell connectors intended for the electrically conductive contacting. A double function is thus provided here as well, namely, electrically conductive contacting and at the same time, mechanical retention of the accumulator cells.

In yet another embodiment of the accumulator module according to the invention, the or each vertical or at least essentially vertical section of a cell connector functions as a spring element. Due to the stepped profile mentioned above and fixing of the horizontal section, for example in the form of fixing in or on the carrier, the or each vertical section, and thus each cell connector, acts overall as a spring element. For a fixed horizontal section, the or each vertical section is elastically movable within the scope of the properties of the material of the cell connector. Any electrical conductor is suitable as material of the cell connector, for example copper or the like. Such materials allow such elastic movability. The or each vertical section together with the adjoining lateral section is thus resiliently elastically movable, and this elastic movability likewise ensures secure electrically conductive contacting of the accumulator cells, in particular simultaneous secure electrically conductive contacting of multiple accumulator cells.

In one special embodiment of the accumulator module, the carrier includes as an integral component the cell connectors intended for the electrically conductive contacting of the accumulator cells that are placeable in the carrier, for example by extrusion-coating the cell connectors with the material of the carrier (plastic) during manufacture of the carrier. The cell connectors are then integrated into the carrier in a vibration-resistant manner. Such a carrier (hybrid part) simplifies the installation of an accumulator module significantly. The carrier is created in one production step, and it is lastly necessary only to provide it with accumulator cells. The provision may even be automated, and may take place in the form of simultaneously providing multiple or all accumulator cells. The electrically conductive connection and mechanical retention of the accumulator cell in the carrier is completed only with the placement of an accumulator cell in such a carrier. Further steps for the electrically conductive contacting or for the mechanical retention are not necessary. By means of the cell connectors included in the carrier, high currents may be transmitted with practically no loss, and may be adapted to the particular needs by the selection of the material of the cell connectors and/or the selection of the material thickness of the cell connectors.

In another embodiment of the accumulator module according to the invention, the carrier has a circumferential edge, and has uniformly spaced journals on a surface bordered by the edge, wherein a group of journals or a section of the edge together with at least one journal defines insertion slots for placement in each case of an accumulator cell in the carrier. The defined insertion slots ensure that a/each accumulator cell placed in the carrier occupies a position in which at least secure electrically conductive contacting, in particular secure electrically conductive contacting and secure mechanical retention, is/are ensured. In addition, the edge and/or the journals function(s) as a guide when an accumulator cell is placed in the carrier or multiple accumulator cells are simultaneously placed in the carrier. For a carrier that is installed vertically or essentially vertically in the accumulator module, the edge and the journals also function as support surfaces for the accumulator cells.

Lastly, in one preferred, optional embodiment of the accumulator module according to the invention it is provided that at least one lateral surface of the housing, in particular at least each lateral surface of the housing to which accumulator cells are thermally coupled, is provided with cooling ribs on the outside, and/or that the housing has cooling channels through which a fluid may flow.

One exemplary embodiment of the invention is explained in greater detail below with reference to the drawings. Corresponding objects or elements are provided with the same reference numerals in all figures.

The exemplary embodiment is not to be construed as limiting to the invention. For example, instead of the round cells shown in the exemplary embodiment, energy storage cells having some other basic geometric shape, for example cuboidal energy storage cells, are suitable, and other possible basic geometric shapes may similarly be construed in each case. In addition, within the scope of the present disclosure, enhancements and modifications are also possible, in particular those that are apparent to those skilled in the art with regard to achieving the object of the invention, for example by combining or modifying individual features or method steps generally or specifically described in connection with the description section and contained in the claims and/or the drawings, and that by use of combinable features result in new subject matter or new method steps or method step sequences.

Figure 1A:
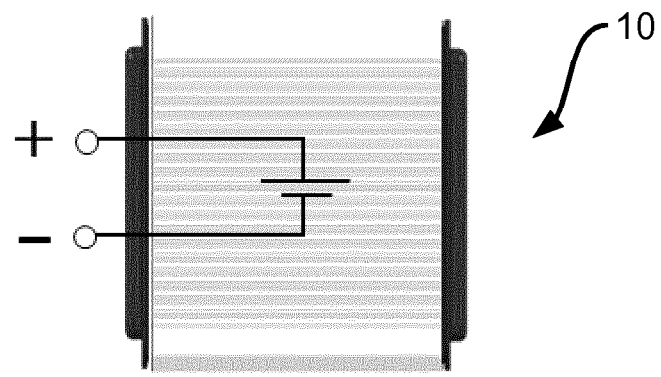
FIG. 1 shows an accumulator module.
Figure 1B:
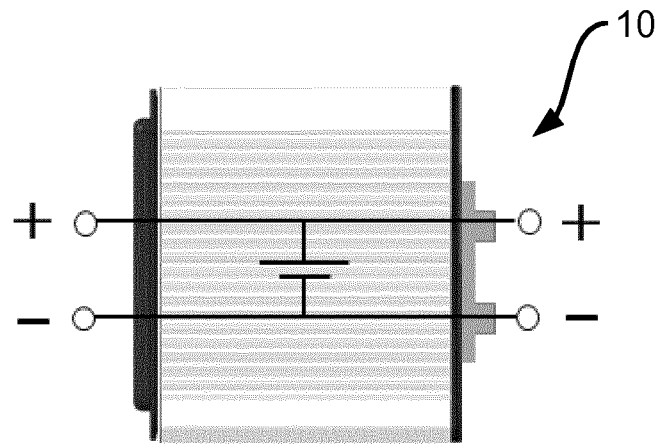
Figure 1C:
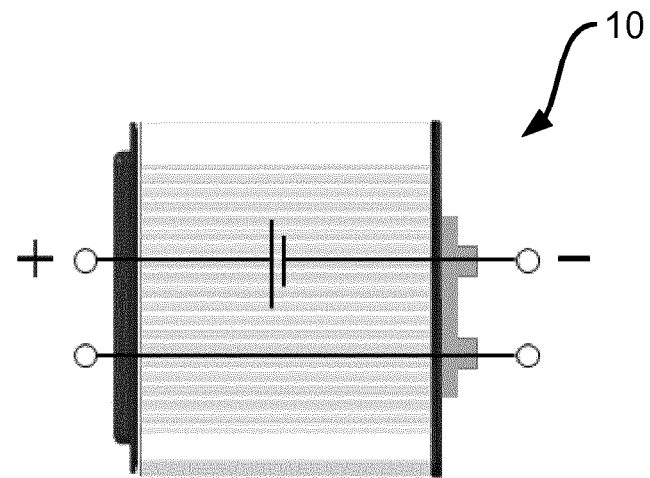

The illustration in FIG. 1 (FIGS. 1A, 1B, 1C) schematically shows in a simplified manner an accumulator module 10 that functions as an energy storage device. An accumulator module 10 according to FIG. 1A may be used alone as a current or voltage source (only the property of the accumulator module 10 as a voltage source is discussed below, as necessary; of course, a function as a current source or in general as an energy source is to construed in each case).

The special feature of an accumulator module 10 of the type proposed here lies in its modularity, as described in the parallel filed U.S. patent application Ser. No. 16/310,815 (internal reference 124 002 P WO, entitled: "Accumulator module"), which is to be incorporated in full into the present description to avoid unnecessary repetitions of this cited reference.

An accumulator module 10 according to FIG. 1A may, for example, be combined with an accumulator module 10 according to FIG. 1B or with an accumulator module 10 according to FIG. 1C. The accumulator modules 10 are arranged in succession in a train-like manner in such a way that a rear side surface of one accumulator module 10 faces a front side surface of an accumulator module 10 that follows in the resulting train. In such a combination, the accumulator module 10 according to FIG. 1A forms the termination of a resulting train. The number of preceding accumulator modules 10 in the train either according to FIG. 1B or alternatively according to FIG. 1C is in principle arbitrary. When multiple accumulator modules 10 according to FIG. 1B are interconnected to a terminating accumulator module 10 according to FIG. 1A, a parallel connection is created, resulting in a current, tappable at the input of the train of the interconnected accumulator modules 10, that is equal to the sum of the currents that are outputtable by the individual accumulator modules 10. When multiple accumulator modules 10 according to FIG. 1C are interconnected with a terminating accumulator module 10 according to FIG. 1A, a series connection is created, resulting in a voltage, tappable at the input of the train of the interconnected accumulator modules 10, that is equal to the sum of the individual voltages of each accumulator module 10.

Figure 2:
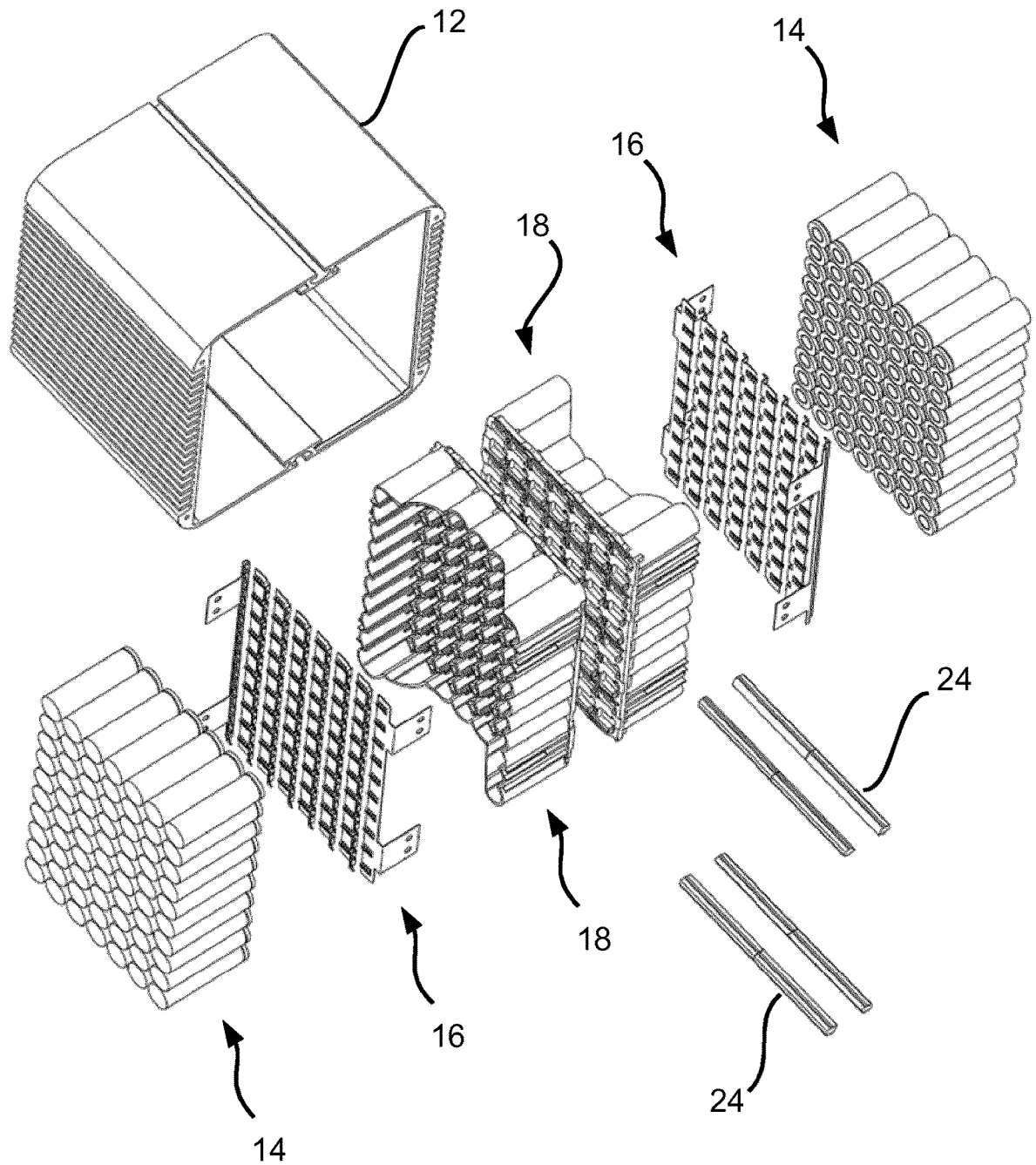
FIG. 2 shows a partially exploded illustration of an accumulator module.

Each accumulator module 10 includes a housing 12 (FIG. 2) that accommodates the accumulator cells 14 (FIG. 2). The illustration in FIG. 2 shows a partially exploded illustration of one embodiment of an accumulator module 10 according to the invention. A section of a train profile functions as a housing 12 or at least essentially as a housing element. Four side surfaces of the housing 12 enclose a cavity that accommodates the accumulator cells 14. The open sides of the housing 12 are closed by (front and rear) side surfaces, not shown here, that function as the front side and the rear side of the accumulator module 10. In an accumulator module 10 according to FIG. 1A, the terminals of the accumulator module 10 are led toward the front side. In an accumulator module 10 according to FIG. 1B or according to FIG. 1C, the terminals of the accumulator module 10 are led on the one hand toward the front side, and on the other hand toward the rear side.

FIG. 2 shows that a plurality of accumulator cells 14 are used and electrically combined in an accumulator module 10 according to the invention. The accumulator cells 14 are combined into two groups each in a matrix-like manner (next to and above one another, i.e., in in rows and columns in a manner of speaking). The number of accumulator cells 14 combined in a row in such a group and the number of rows depend on the shape and size of the accumulator cells 14 as well as the internal volume of the housing 12, but in principle are arbitrary. The dimensions (rows, columns) of both groups within an accumulator module 10 are preferably identical.

The accumulator cells 14 are electroconductively contacted by means of contact elements that function as cell connectors 16. A carrier 18 accommodates the accumulator cells 14 and the cell connectors 16. The carrier 18 accommodates the cell connectors 16 in that the material of the carrier 18 surrounds the cell connectors 16 in sections. The carrier 18 is a hybrid part, and includes the cell connectors 16 as an integral component. The carrier 18 accommodates the accumulator cells 14 in insertion slots provided for this purpose. The carrier 18 holds (in the sense of fixing) the individual accumulator cells 14 in the positions specified by the insertion slots, and fixes them in their axial orientation. Situated between two equipped carriers 18 that are placed in the housing 12 is a central unit (not shown), for example a central unit that includes a battery management system basically known per se, a current measuring section, a switchable relay, and/or a safety fuse, and that exits from the outwardly led terminal contacts.

Figure 3:
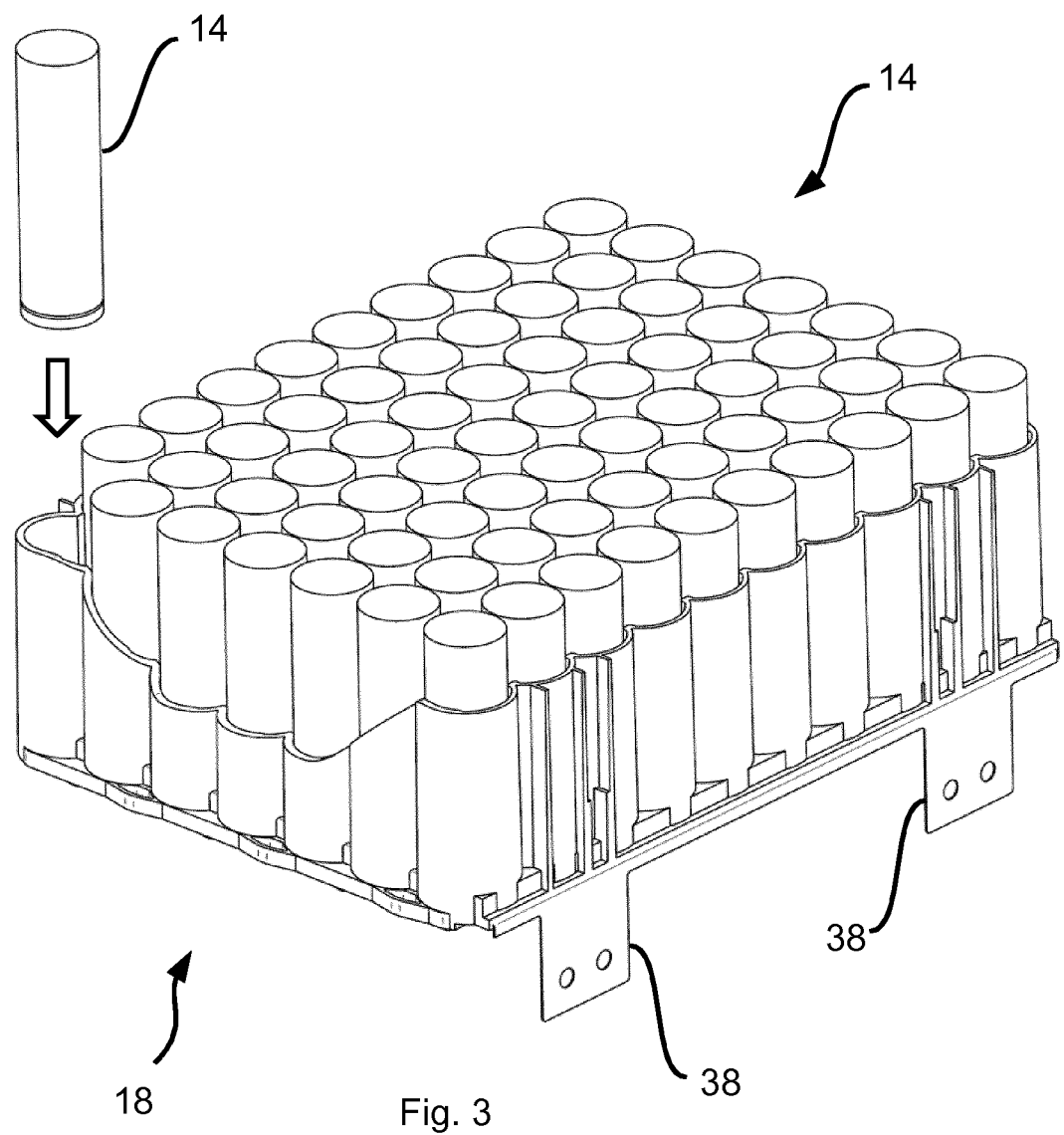
FIGS. 3, 4, and 5 show a carrier for an accumulator module according to FIG. 2, which is intended for accommodating a plurality of accumulator cells.

A carrier 18 equipped with accumulator cells 14 is shown in the illustration in FIG. 3. For clarification of the placement of an accumulator cell 14 in its insertion slot in the carrier 18, an accumulator cell 14 is shown above the carrier 18 and above the insertion slot provided to accommodate it. The accumulator cell 14 is inserted into the carrier 18 by moving it along the direction depicted by the block arrow in FIG. 3, and is placed in the free insertion slot in the carrier 18.

Figure 4:
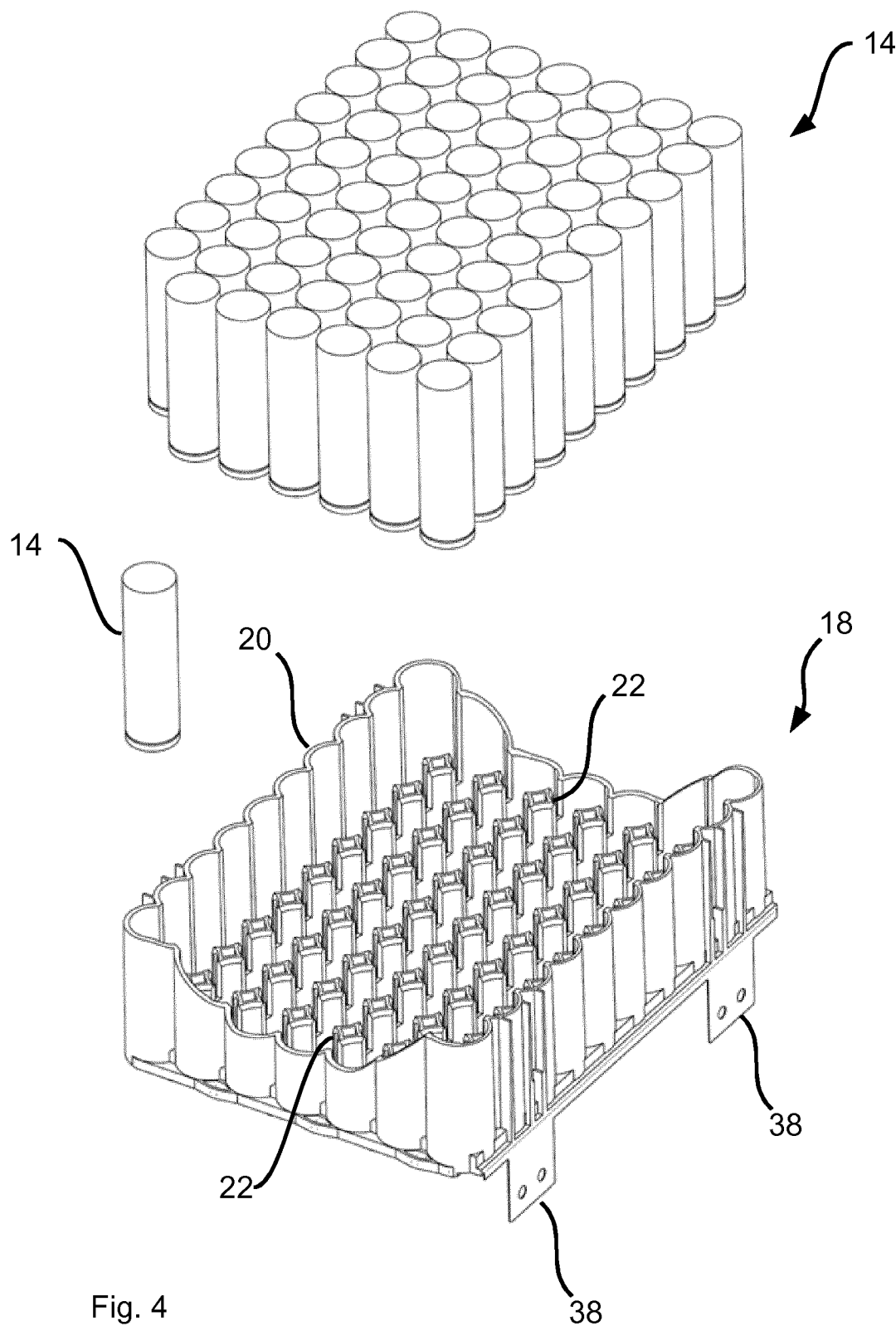

The illustration in FIG. 4 shows on the one hand the carrier 18 (with the cell connectors 16 integrally connected thereto), and on the other hand, above the carrier 18, the accumulator cells 14 intended for placement in the carrier 18. Further details of the carrier 18 are apparent from the illustration in FIG. 4. The carrier 18 has an outer circumferential edge 20, and uniformly spaced dome-like journals 22 in the area bordered by the edge 20. Each journal 22 has four concave surface sections that are uniformly spaced in the circumferential direction of the journal 22, namely, surface sections of a cylinder shell. The radius of these surface sections corresponds essentially to the radius of an accumulator cell 14 designed as a round cell. It is apparent in the illustration that a plurality of journals 22 are situated next to one another in a matrix-like structure in the area bordered by the edge 20. The distance between the journals 22 corresponds essentially to the diameter of an accumulator cell 14 designed as a round cell. In each case a group of four journals 22 holds (in the sense of fixing) an accumulator cell 14 and fixes it in the axial direction. The edge 20 includes a plurality of adjoining surface sections that are concave in the direction of the journals 22, namely, surface sections of a cylinder shell. The radius of these surface sections likewise corresponds essentially to the radius of an accumulator cell 14 designed as a round cell. Such a surface section together with two adjacent journals 22 in each case holds (in the sense of fixing) an accumulator cell 14 and fixes it in the axial direction. At the four corners of the edge 20, this results in a concave surface section whose radius likewise corresponds essentially to the radius of an accumulator cell 14 designed as a round cell. However, the arc length of this surface section is longer than the arc length of the above-mentioned surface sections of the edge 20, and this surface section together with the one adjacent journal 22 in each case likewise holds (in the sense of fixing) an accumulator cell 14 and fixes it in the axial direction. When a variable (radius, diameter) has been specified by the term "essentially" in this paragraph, this is understood to mean that, for example, the radius of the surface sections of the journals 22 is slightly larger than the radius of the accumulator cell 14, so that a form-fit surface fit is possible.

Figure 5:
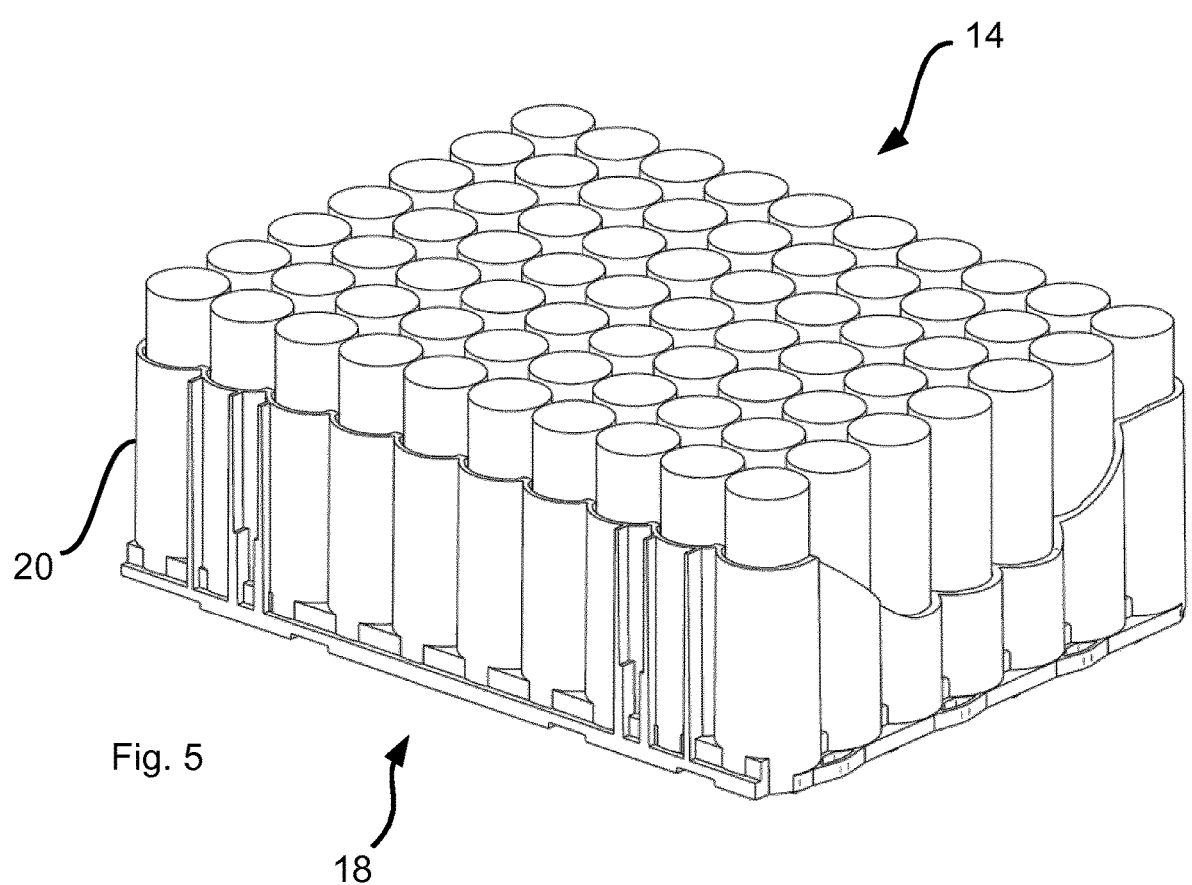

The illustration in FIG. 5 shows the carrier 18 according to FIGS. 3 and 4 from a different perspective, and accumulator cells 14 placed therein. In this fully equipped configuration, in each case two carriers 18 are pushed into the housing 12 (FIG. 2), and in the state inserted into the housing 12 are fixed in the housing 12 by means of at least one spacer piece 24 (FIG. 2) that is insertable between the carriers 18 and that functions as a spreading element, particularly preferably in such a way that the free top sides/free end sides/free end faces of the accumulator cells 14 inserted into the carriers 18 rest against the inner surface of the housing 12 for heat dissipation on the housing 12.

The carriers 18 are dimensioned in such a way that they fit exactly in the housing 12. In the inserted state, the particular carrier 18 is thus already fixed to some extent in the housing 12. For a housing 12 according to FIG. 2, i.e., a housing 12 having an inwardly pointing T profile, the T profile determines a minimum distance between the carriers 18, and the spacer pieces 24 are each pushed beneath a leg of the T profile, and thus between the T profile and the respective adjoining carrier 18. The spacer pieces 24 are guided through the T profile during insertion. The spacer pieces 24 have a slightly wedged shape; i.e., they increase in their effective width (effective in the spreading direction) along their longitudinal axis, and thus cause a displacement of the particular carrier 18 in the direction of the nearest side surface of the housing 12, and ultimately, the fixing of the carrier 18 in the housing 12.

The illustration in FIG. 6 once again shows details of the electrical contacting of the accumulator cells 14 inserted into a carrier 18. Portions of the journals 22 of the carrier 18 are also discernible between the accumulator cells 14. For the electrical contacting of the accumulator cells 14 proposed here, it is essential that insulation 26 extends over only a portion of the overall height of the accumulator cells 14.

It is known that battery cells 14 in a customary configuration as round cells or the like are contacted at both ends (end faces), namely, on the one hand at a center contact 28 that protrudes beyond one of the two end faces, and on the other hand, at the oppositely situated end face, the insulation 26 being dispensed with at this opposite end face, so that the metallic casing, which as a whole represents the center contact 28 that functions as a first contact, as well as the second contact of the accumulator cell 14, is exposed. Instead of such contacting (contacting on both sides) which has been customary thus far, according to the approach proposed here the contacting of the accumulator cells 14 takes place solely from one side. Thus, the opposite side which heretofore has likewise been contacted is available, for example and in principle optionally, for heat dissipation.

Figure 6:
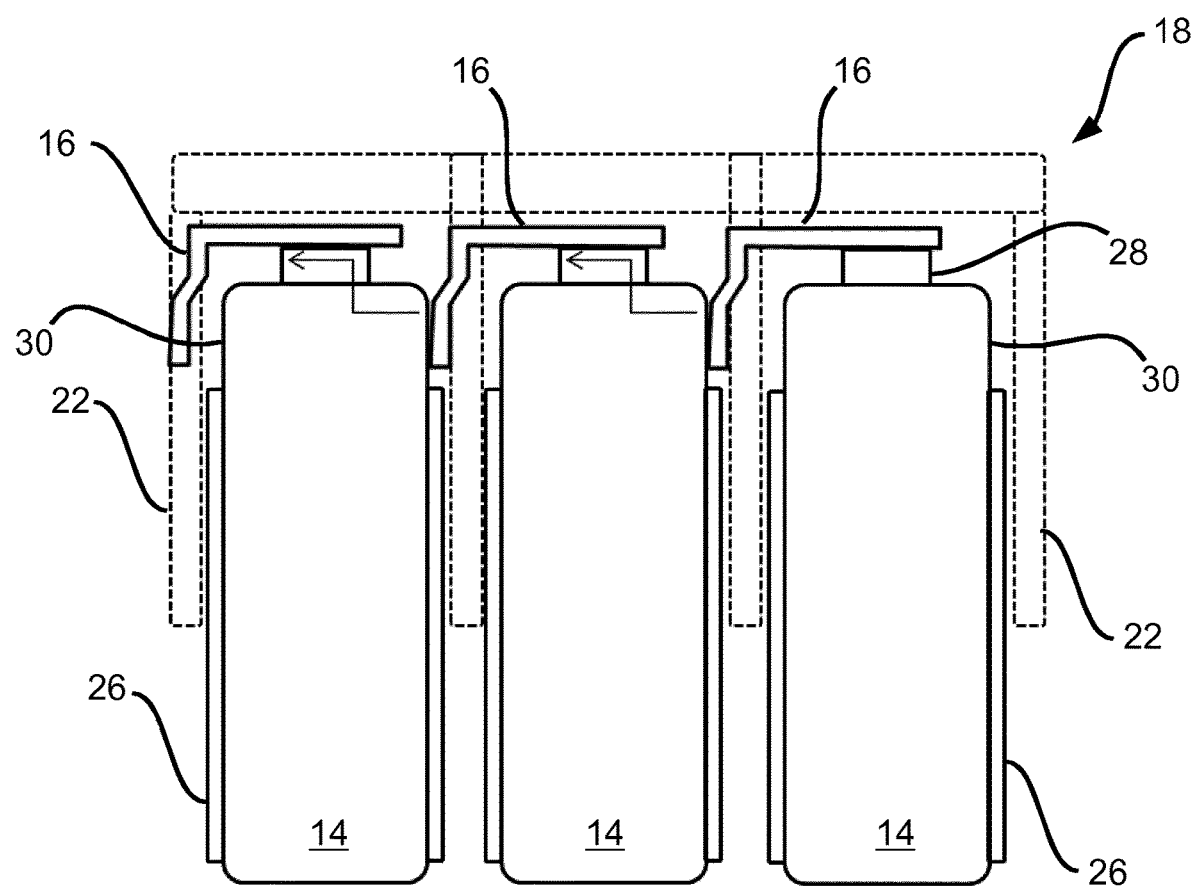
FIGS. 6, 7, and 8 show one-side electrically conductive contacting, proposed herein, of the accumulator cells in a carrier intended for accommodating same.

The one-side contacting of the accumulator cells according to the approach proposed herein is based on use of specially shaped cell connectors 16, which on the one hand contact the center contact 28 of at least one first accumulator cell 14, and on the other hand contact an area, free of insulation 26, of the circumferential surface 30 of at least one adjacent further accumulator cell 14. The contacting of a plurality of accumulator cells 14 thus proceeds from the cover surface of an accumulator cell 14 and the center contact 28 at that location, to a side surface of a further accumulator cell 14 and an area of the circumferential surface 30 that is free of insulation 26 at that location. The illustration in FIG. 6 shows this form of contacting, using three accumulator cells 14 as an example. Based on the illustration, it is readily conceivable that further accumulator cells 14 may adjoin at the left and right of the three accumulator cells 14 shown. In addition, it is likewise readily conceivable that accumulator cells 14, which are contactable by means of an elongated cell connector 16 extending transversely with respect to the plane of the drawing, may be situated in front of and behind the three accumulator cells 14 shown. This results in the above-mentioned matrix-like arrangement of the accumulator cells 14, which are all contacted from one side in the described manner.

Figure 7:
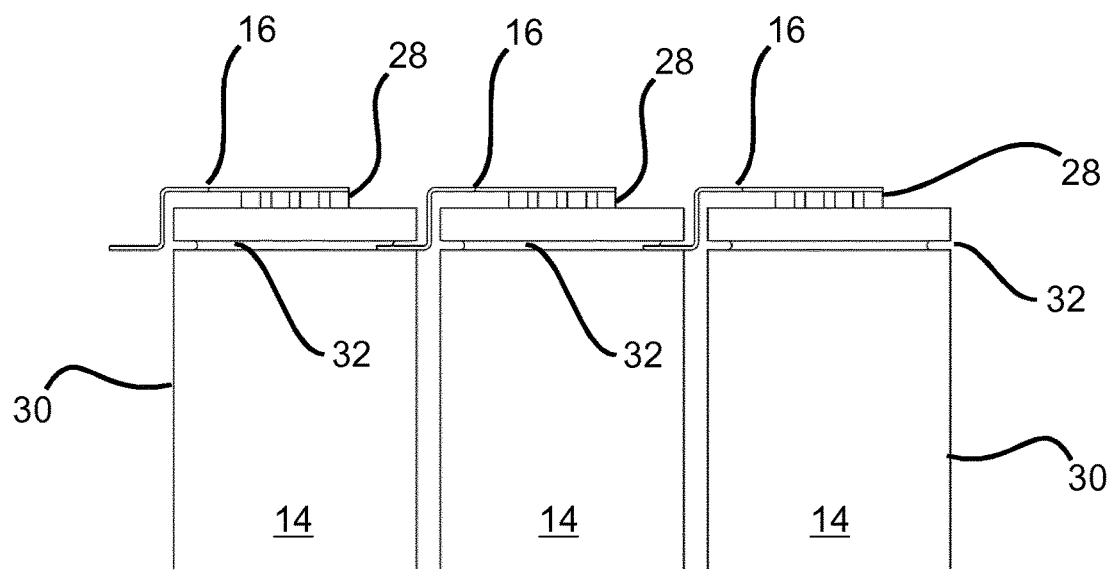

The illustration in FIG. 6 is a schematically simplified illustration of the basic principle of the one-side contacting of the accumulator cells 14. The illustration shows one possible embodiment of the cell connectors 16. The illustration in FIG. 7 shows one preferred specific embodiment of the cell connectors 16. In principle, each cell connector 16 on the one hand contacts the center contact 28 of at least one accumulator cell 14, and on the other hand contacts the circumferential surface 30 of at least one adjacent accumulator cell 14. In the embodiment according to FIG. 7, the contacting of the circumferential surface 30 takes place in the area of a constriction 32 in the circumferential surface 30. The end of the cell connector 16 provided for contacting the circumferential surface 30 engages with this constriction 32, and this engagement brings about on the one hand secure electrically conductive contacting of the particular accumulator cell 14, and on the other hand also (locking) axial fixing of the particular accumulator cell 14.

Figure 8:
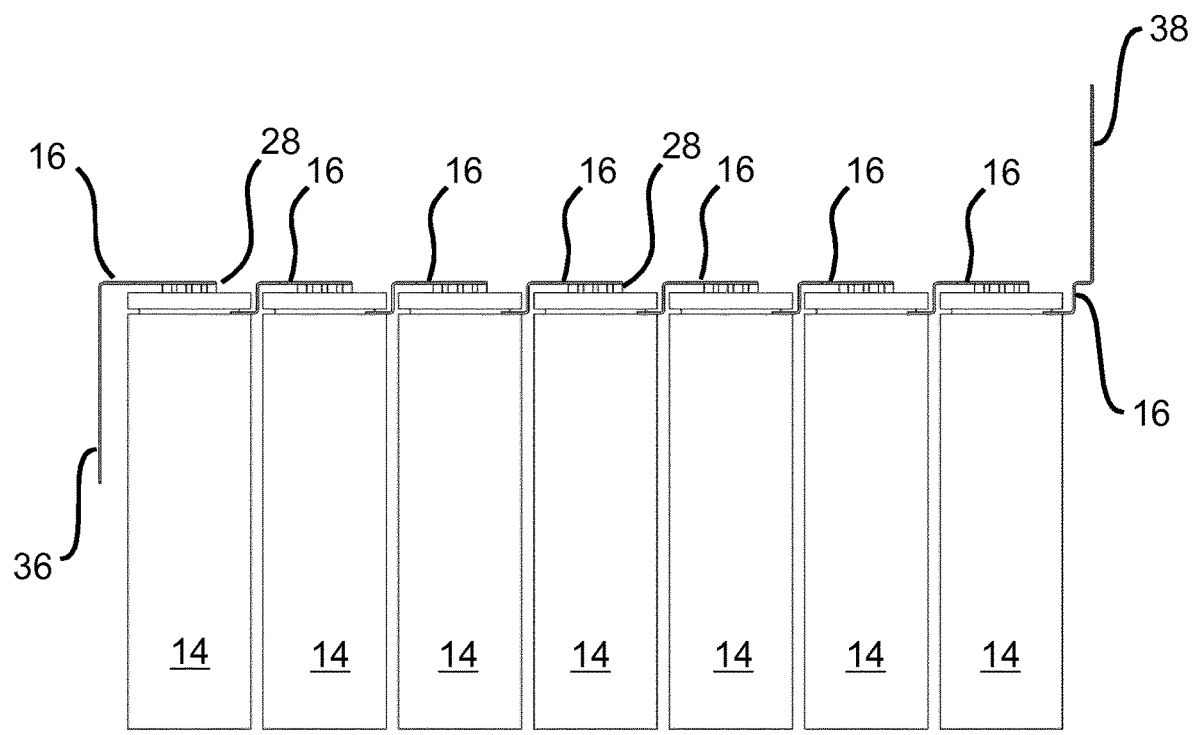

The illustration in FIG. 8 shows a side view of a group of accumulator cells 14 as in FIG. 3 or FIG. 4, i.e., a group of accumulator cells 14 that are placeable together in a carrier 18. It is pointed out that the group of accumulator cells 14 shown in FIG. 8 includes exactly seven accumulator cells 14. According to FIGS. 3 and 4, 7×10 accumulator cells 14 are placeable in the carrier 18. The group shown in FIG. 8 is thus one of the group of seven in the carrier 18. Of course, for a carrier 18 having larger or smaller dimensions, other numerical values are possible, and the numerical values mentioned here as well as the illustrated numbers are strictly by way of example.

The accumulator cells 14 in a group according to FIG. 8 are connected to one another in the manner shown in FIG. 7; thus, the illustration in FIG. 7 may be understood as an enlarged detail of the illustration in FIG. 8. The electrically conductive connection of the group of accumulator cells 14 (further accumulator cells 14 are situated transversely with respect to the plane of the drawing, behind the accumulator cells 14 shown) is completed by means of two special cell connectors 16 that function as the first and the last cell connector 16, and that have end-position terminal tabs 36, 38 (first terminal tabs 36, second terminal tabs 38), already shown in the illustrations in FIGS. 2, 3, and 4 but not identified in FIG. 2. These special cell connectors 16 in each case contact only one row (group) of accumulator cells 14, namely, the special cell connector 16 shown at the right in FIG. 8, in that it engages with the constriction 32 in the circumferential surfaces 30 of the accumulator cells 14, and the special cell connector 16 shown at the left in FIG. 8, in that it contacts the center contacts 28 of the accumulator cells 14. The above-described cell connectors 16 (FIG. 7) are situated between these two special cell connectors 16, and in contrast, in each case contact two (spatially) parallel, adjacent rows (groups) of accumulator cells 14. The first terminal tabs 36 are in each case directly or indirectly connected (via the central unit, for example) to an outwardly guided terminal contact of the accumulator module 10. The second terminal tabs 38 are used for a series connection of the carriers 18 and the accumulator cells 14 included in same.

Figure 9:
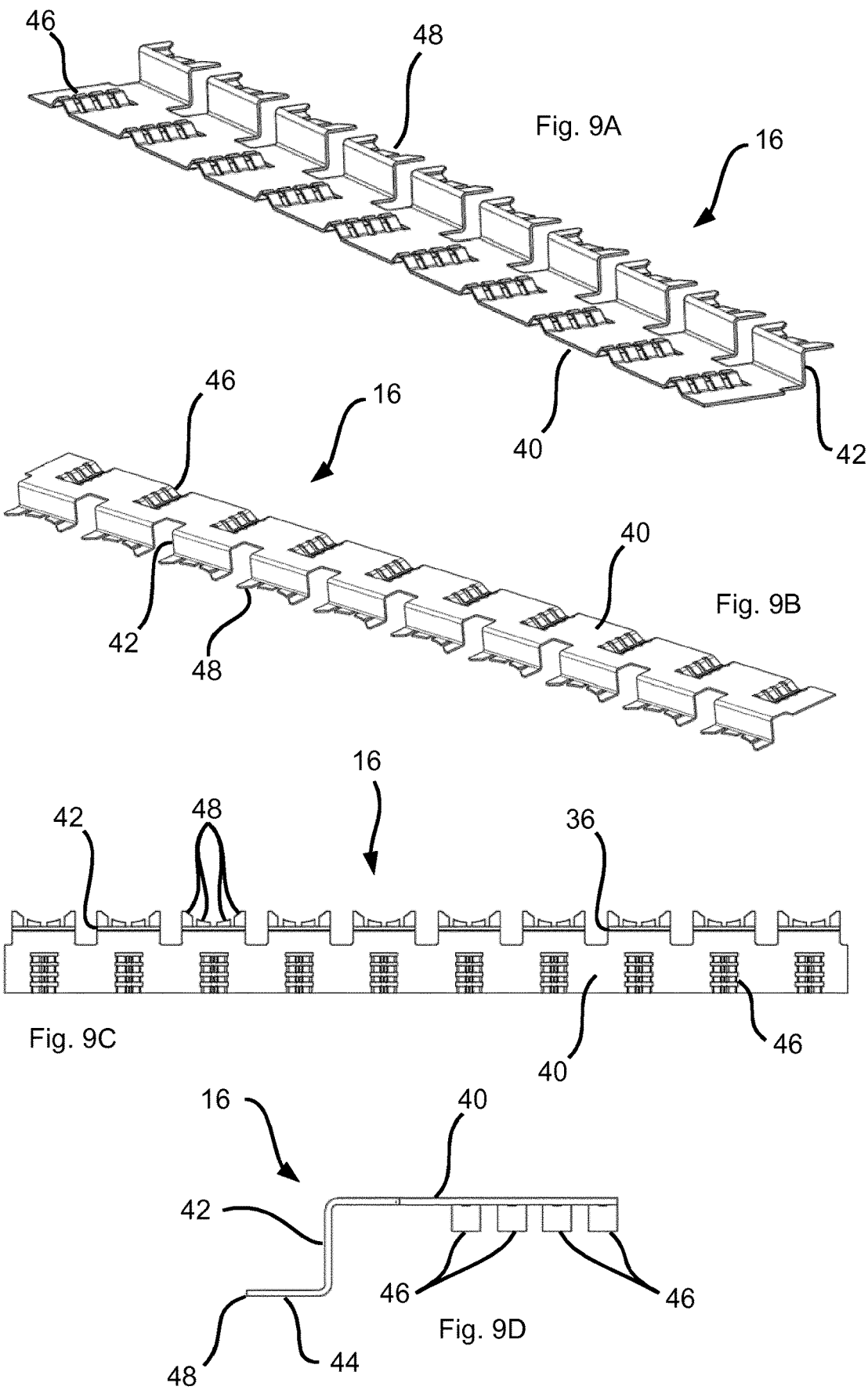
FIG. 9 shows a cell connector that is provided for such one-side contacting, in different views.

The illustration in FIG. 9 (FIGS. 9A, 9B, 9C, and 9D) show such an elongated cell connector 16 in different views. The angular design already shown in FIGS. 6, 7, and 8 and the stepped profile of the cell connector 16 are apparent in particular in the top view of one of the end sides of the cell connector 16 in the illustration in FIG. 9D (viewing direction parallel to the longitudinal axis of the cell connector 16). Accordingly, a cell connector 16 includes three sections, which for the purpose of simple terminology are referred to as the horizontal section 40, the vertical section 42, and the lateral section 44. By means of the horizontal section 40, the center contacts 28 are contacted by accumulator cells 14 that are spatially aligned in a row and combined into a group due to the spatial alignment in a row. By means of the lateral section 44, the circumferential surfaces 30 are contacted by the further accumulator cells 14 that are spatially aligned in a row in parallel and likewise combined into a group due to the spatial alignment in a row. The lateral section 44 may also be understood as a combination of multiple lateral sections 44 in a plane, each individual lateral section 44 being intended for contacting an accumulator cell 14. In the embodiment shown (see in particular the illustrations in FIGS. 9A and 9B), each such lateral section 44 adjoins a separate vertical section 42, so that the cell connector 16 in the embodiment shown encompasses, in one piece, the elongated horizontal section 40 as well as multiple uniformly spaced vertical sections 42 emanating therefrom, and lateral sections 44 that in each case adjoin same. Each cell connector 16 is fixed in or on the carrier 18, for example by injection-molding the horizontal section 40 of each cell connector 16 with the material of the carrier 18 during its manufacture.

In the embodiment shown, the horizontal section 40 includes eight resilient, angled contact tongues 46 arranged in pairs and facing one another with their free end, wherein more or fewer contact tongues 46 are also suitable in principle, and the arrangement in pairs represents only one special embodiment. However, the embodiment shown, with contact tongues 46 oriented in parallel, is characterized by ease of manufacture. The free ends of the or each contact tongue 46 rest on a contacted center contact 28 of an accumulator cell 14, or the center contact 28 of an accumulator cell 14 rests on the free ends of the or each contact tongue 46. The plurality of contact tongues 46 ensures that, for example, if one or even multiple contact tongues 46 is/are damaged, the remaining contact tongues 46 still establish a secure electrically conductive connection. In addition, each individual contact tongue 46 resting against the contact 28 establishes electrically conductive contact with the accumulator cell 14, resulting in a plurality of simultaneously effective contacts. This ensures secure electrically conductive contacting of the center contact 28 with as little contact resistance as possible.

Each lateral section 44 ends in at least one contact tab 48. The contact tabs 48 are particularly clearly apparent in the illustration in FIG. 9C, which shows a top view of the cell connector 16. In the embodiment shown, four contact tabs 48 oriented in parallel are provided for contacting an accumulator cell 14 in each case, and together form a group of contact tabs 48. More or fewer than four contact tabs 48 are likewise possible in principle. It is apparent that the contact tabs 48 that are in each case part of a group have different lengths. Two outer, long contact tabs 48 enclose two inner, shorter contact tabs 48. The ends of the contact tabs 48 of a group together describe a circular arc, and the radius of the circular arc corresponds to the radius of an accumulator cell 14 designed as a round cell, or, within the meaning of the version described above, at least essentially corresponds to the radius of an accumulator cell 14 designed as a round cell.

In one embodiment according to FIG. 9, the cell connector 16 with the contact tabs 48 engages with the constriction 32 of the circumferential surfaces 30 of the accumulator cells 14, and the mentioned circular arc shape ensures that each individual contact tab 48 engages with the constriction 32. Here as well, the plurality of contact tabs 48 ensures that, for example, even if one or even multiple contact tabs 48 is/are damaged, the remaining contact tabs 48 still establish a secure electrically conductive connection. In addition, each individual contact tab 48 that engages with the constriction 32 and/or rests against the circumferential surface 30 of the accumulator cell 14 establishes electrically conductive contact with the accumulator cell 14, resulting in a plurality of simultaneously effective contacts. Here as well, this ensures secure electrically conductive contacting of the circumferential surface 30 of the accumulator cell 14 with as little contact resistance as possible.

Figure 10:
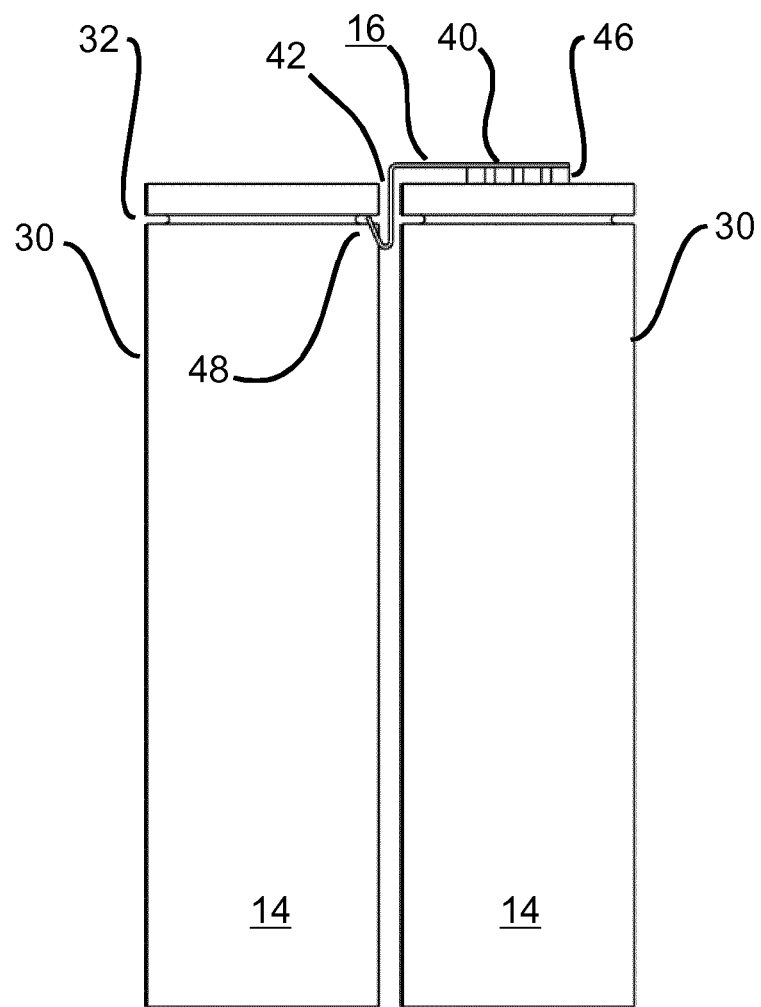
FIG. 10 shows two accumulator cells that are electroconductively connected by means of a cell connector according to FIG. 9, FIGS. 11 and 12 show the carrier in a view from above, with the cell connectors embedded therein.

The engagement with the constriction 32 is made possible/facilitated by the elastic deformability of the contact tabs 48 provided within the scope of the material properties of the cell connector 16. In addition, in one special embodiment the vertical section 42 also acts as a spring element with its elastic deformability provided within the scope of the material properties of the cell connector 16. The cell connector 16 is made at least of an electrically conductive material, for example copper or copper alloys. When an accumulator cell 14 is inserted into the carrier 18, the contact tabs 48 initially come into contact with the general circumferential surface 30 of the accumulator cell 14. By bending over the contact tabs 48 and/or bending back the vertical section 42 in the direction toward the horizontal section 40, the contact tabs 48 may yield and slide along the circumferential surface 30 of the accumulator cell 14 upon further insertion of the accumulator cell 14 into the carrier 18. Upon even further insertion of the accumulator cell 14 into the carrier 18, the contact tabs 48 ultimately reach the area of the constriction 32 and submerge into same. This is shown in the illustration in FIG. 10, using the example of two accumulator cells 14 and a cell connector 16 that connects them. During insertion of the accumulator cell 14 shown at the left in the axial direction, the contact tabs 48 are bent over into the carrier 18 (not shown) in the insertion direction. The horizontal section 40 and the vertical section 42 of the cell connector 16 are fixedly connected to the carrier 18, for example enclosed by the material of the carrier 18. For a corresponding axial position of the accumulator cell 14, the ends of the contact tabs 48 engage with the constriction 32. At that location the contact tabs 48 rest at least on an edge of the constriction 32 (in the illustration, on the bottom edge of the constriction 32), which results in electrically conductive contact here with the circumferential surface 30 of the accumulator cell 14. The ends of the contact tabs 48 also generally rest against a surface that borders the constriction 32 (in the illustration, against the top horizontal surface bordering the constriction 32). This results in further electrically conductive contact here with the circumferential surface 30 of the accumulator cell 14.

In the case of a resilient vertical section 42, this section springs back when the contact tabs 48 engage with the constriction 32. Regardless of an optional resilient property of the vertical section 42, an accumulator cell 14 on the one hand is securely electroconductively contacted by means of the contact tabs 48, and on the other hand is releasably locked in the carrier 18 by means of the same contact tabs 48. For removal of an accumulator cell 14 from the carrier 18, the sequence described above is reversed. During removal, it is first necessary to release the detent lock provided by the contact tabs 48, and for this purpose appropriate force must be applied to ensure that an accumulator cell 14 that is locked in the carrier 18 does not inadvertently come out.

The height of a cell connector 16, which is determined by the length of the vertical section 42, together with the position of the constriction 32 in the circumferential surface 30 of the accumulator cells 14, is selected in such a way that when the contact tabs 48 engage with the constrictions 32 of a first row of accumulator cells 14, the contact tongues 46, under mechanical tension, rest on the center contacts 28 of an adjoining second row of accumulator cells 14. In the inserted state in the carrier 18, each individual accumulator cell 14 is thus clamped, in a manner of speaking, between the contact tongues 46 of one cell connector 16 and the contact tabs 48 of the neighboring cell connector 16. This ensures not only the secure mechanical retention mentioned above and the releasable locking in the carrier 18, but in particular also secure, long-lasting electrically conductive contacting of each accumulator cell 14.

The two special cell connectors 16 mentioned above in conjunction with the explanation of the illustration in FIG. 8 are basically cell connectors 16 that are divided essentially along their longitudinal axis, with lateral terminal tabs 36, 38. One of these special cell connectors 16 (FIG. 8, right side) includes the contact tabs 48, or in general, means for contacting a group of accumulator cells 14 at their circumferential surfaces 30, in particular in constrictions 32 in the circumferential surfaces 30. The other special cell connector 16 (FIG. 8, left side) includes the contact tongues 46, or in general, means for contacting a group of accumulator cells 14 at their end faces, in particular their center contacts 28.

Figure 11:
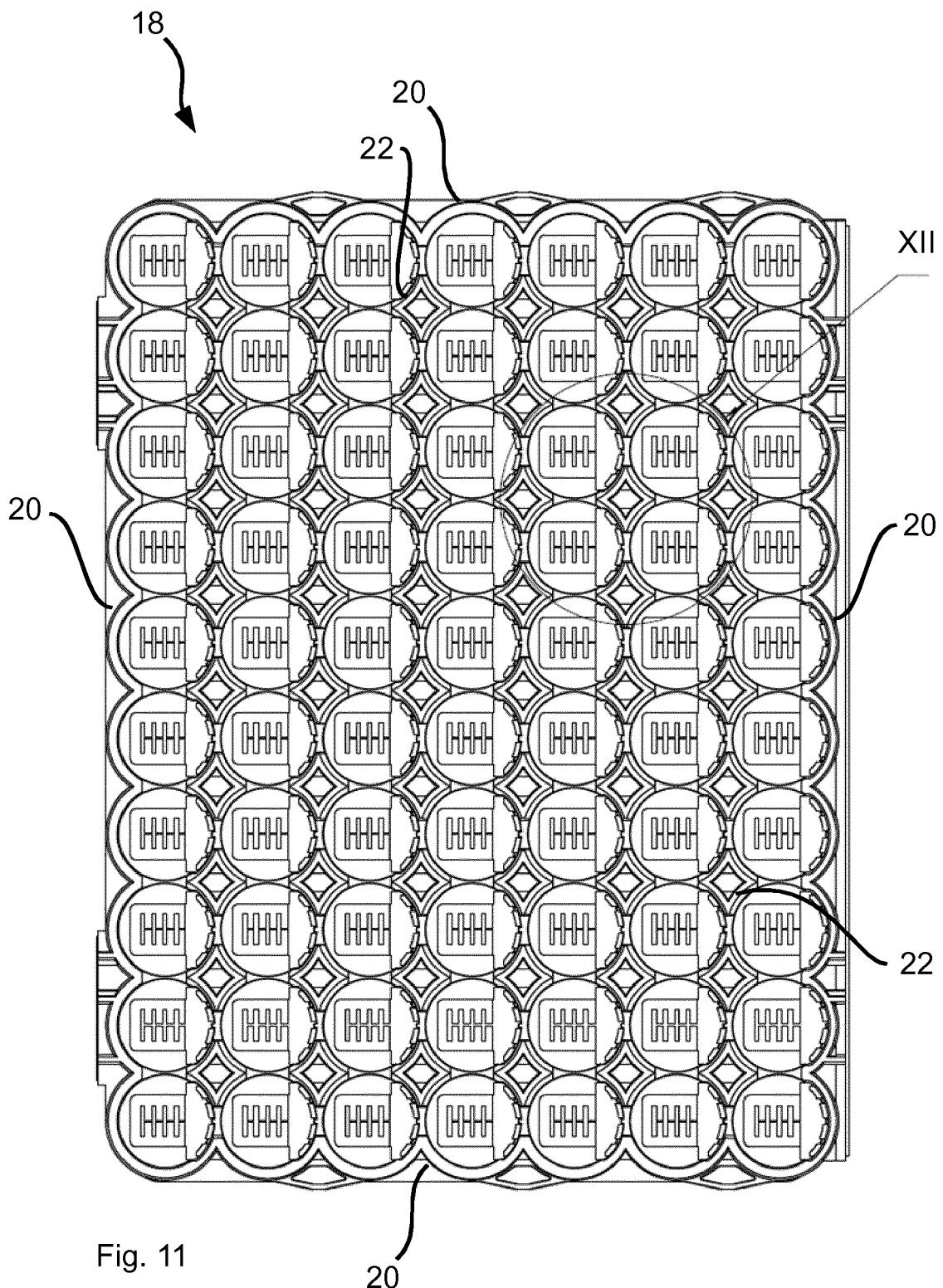
Figure 12:
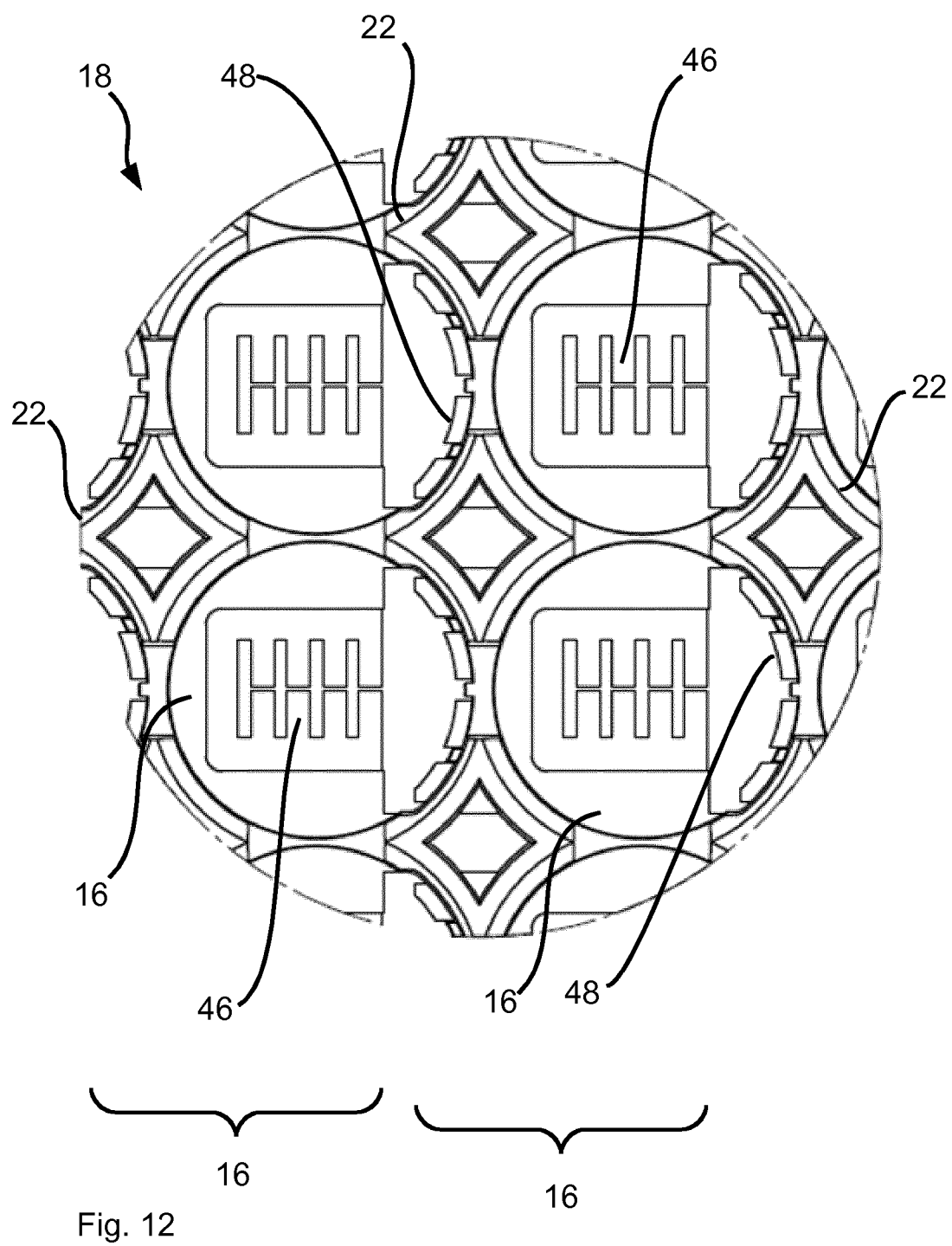

The illustrations in FIGS. 11 and 12 (FIG. 12 as an enlarged detail of FIG. 11) show the carrier 18 with the cell connectors 16 included by same (embedded therein) in a top view. The circumferential edge 20 as well as the uniformly spaced journals 22 are apparent. The contact tongues 46 and the contact tabs 48 of the cell connectors 16 are apparent at the base of the channels, which remain between the journals 22 or between the journals 22 and the edge 20, for accommodating an accumulator cell 14 in each case (see in particular the enlarged illustration in FIG. 12). The curly brackets in the lower area of the illustration in FIG. 12 denote the width of a respective cell connector 16, so that it is clear that a cell connector 16 on the one hand covers the holding positions, situated in a row, for an accumulator cell 14 in each case in the carrier 18, and on the other hand extends to the holding positions of a neighboring row in the carrier 18.

Figure 13:
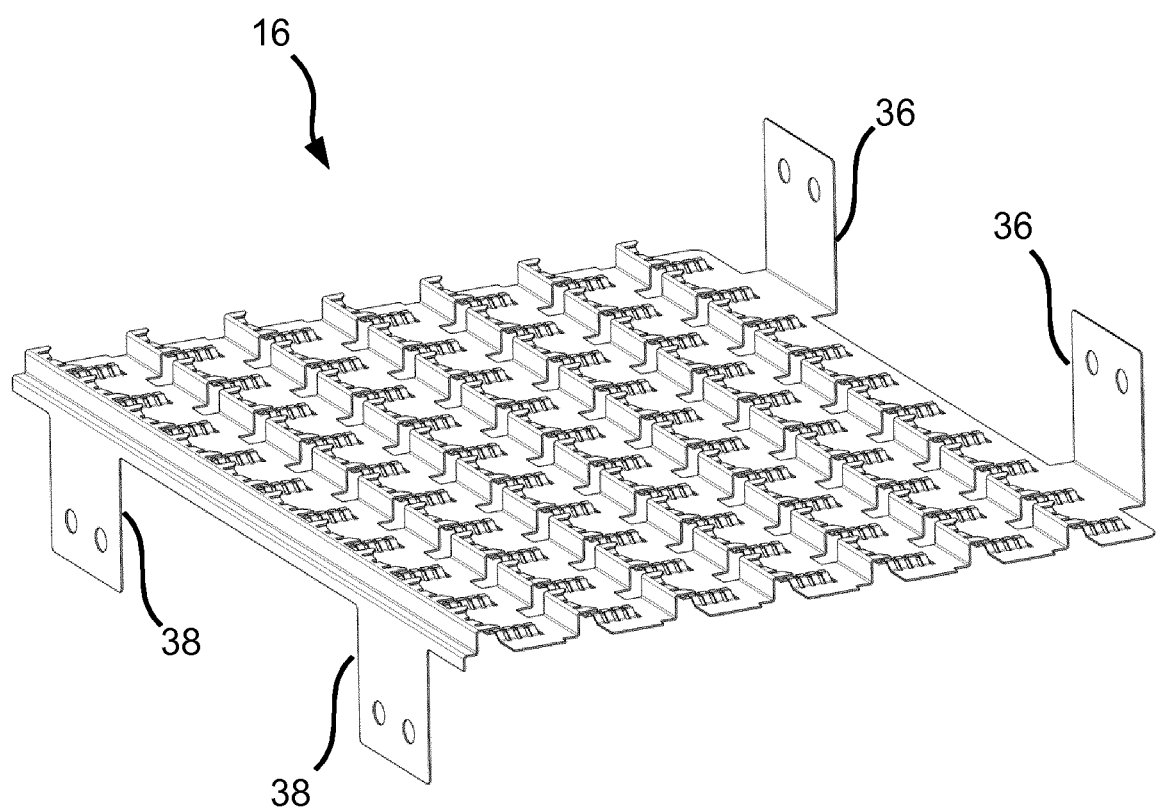
FIG. 13 shows the entirety of all cell connectors embedded in a carrier, without the surrounding carrier.

FIG. 13 shows once more (as in FIG. 2) the entirety of the cell connectors 16 that are part of a carrier 18, together with the outer special cell connectors 16 and their terminal tabs 36, 38 as well as the cell connectors 16 that are enclosed by the special cell connectors 16. It is apparent that the cell connectors 16 that are part of a carrier 18 are uniformly spaced and oriented in parallel to one another.

Figure 14:
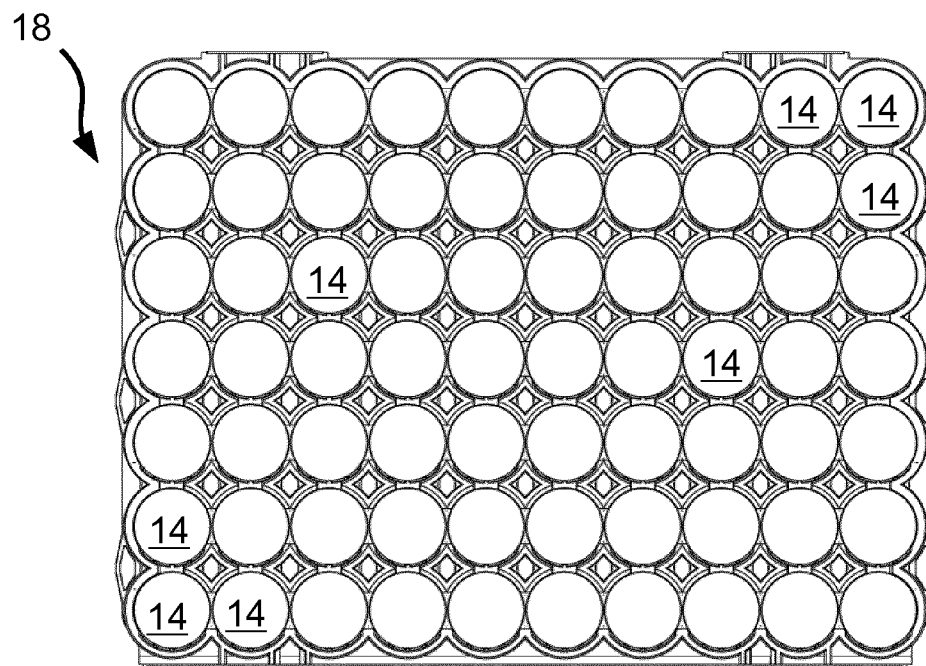
FIG. 14 shows a carrier that is fully equipped with accumulator cells, in a top view.
Figure 15:
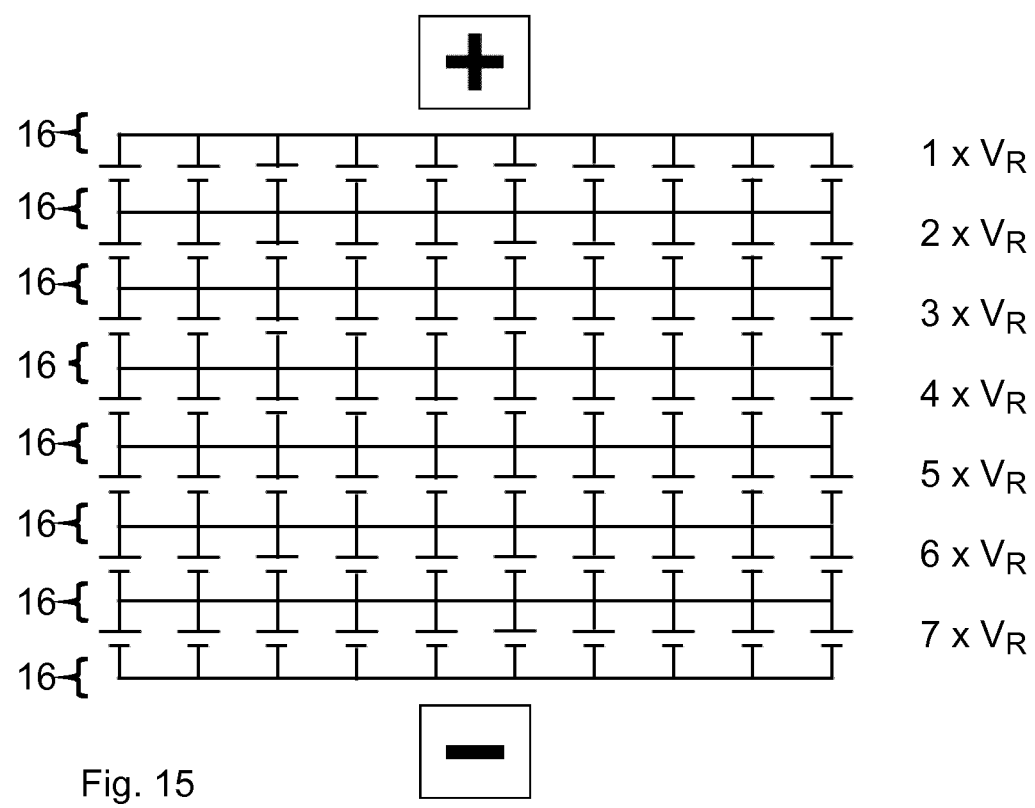
FIG. 15 shows an electrical equivalent circuit diagram for the fully equipped carrier according to FIG. 14.

Lastly, FIGS. 14 and 15 respectively show a carrier 18 that is fully equipped with accumulator cells 14, and the circuit diagram of such a carrier 18, with the accumulator cells 14 included by same, illustrated by the corresponding circuit symbols, and the interconnection of the accumulator cells 14 that results due to the cell connectors 16. Here as well, analogously to the illustration in FIG. 12, once again the areas of the cell connectors 16 are denoted by curly brackets. To the right of the circuit diagram, the text "$1 \times V_R$," "$2 \times V_R$," etc., indicates that the voltage that is tappable at a fully equipped carrier 18 increases with each row of accumulator cells 14, where $V_R$ denotes the voltage that results across a row due to the parallel connection of multiple accumulator cells 14 in such a row (in the present case, ten accumulator cells 14 by way of example).

The description of the exemplary embodiment now turns to the aspect of heat dissipation. When the electrical energy stored in a galvanic cell is utilized, it is known that cell heating occurs due to the internal resistance. Increased or increasing ambient temperature accelerates undesirable side reactions, and thus, the aging behavior of an accumulator cell 14. This also applies for the accumulator cells 14 of the accumulator module 10 proposed herein. In addition, the speed of the self-discharge of an accumulator cell 14 is a function of the temperature, among other factors. Therefore, efficient dissipation of the heat from the accumulator module 10 is meaningful. Conversely, low ambient temperatures, in particular temperatures below the freezing point of water, are similarly unfavorable, so that dissipation of heat from the accumulator module 10, and thus, an overall temperature-dependent adjustment of the temperature of the accumulator module 10, are also meaningful.

It is apparent in the partially exploded illustration according to FIG. 2 that the uncontacted end faces of the accumulator cells 14 placed in each case in a carrier 18 face the inner side of a side surface of the housing 12. Due to the one-side contacting of the accumulator cells 14 described above, the end faces, opposite from the end faces with the center contact 28, of all accumulator cells 14 placed in a carrier 18 are free and are available for efficient heat dissipation. These end faces of the accumulator cells 14 are metallic, specific to the design, since these end faces in addition to the center contact 28 are generally used as a second contact when an accumulator cell 14 is connected. The metallic end faces also allow efficient heat transfer. The entirety of the metallic end faces of all accumulator cells 14 combined in a carrier 18 is also particularly clearly apparent in the illustrations in FIGS. 3, 4, and 5. It is also apparent that the stated end faces of all accumulator cells 14 combined in a carrier 18 are in flush alignment with one another. All end faces thus lie in the same plane or at least essentially in the same plane.

The heat transfer takes place in that all accumulator cells 14 placed in a carrier 18 rest with their above-mentioned end faces against the inner of a side surface of the housing 12, so that heat transfer to the housing 12 occurs. Accordingly, heat conduction takes place in the material of the housing 12 according to physical laws, so that the outer surface of the housing 12 is heated. This heat, likewise according to physical laws, is released to the surroundings by convection. The heat release may in principle be increased in a manner known per se by increasing the effective surface of the housing 12, and accordingly the housing 12 optionally has ribs or the like, in any case surface-enlarging elements, on the outer surface of at least individual side surfaces.

Figure 16:
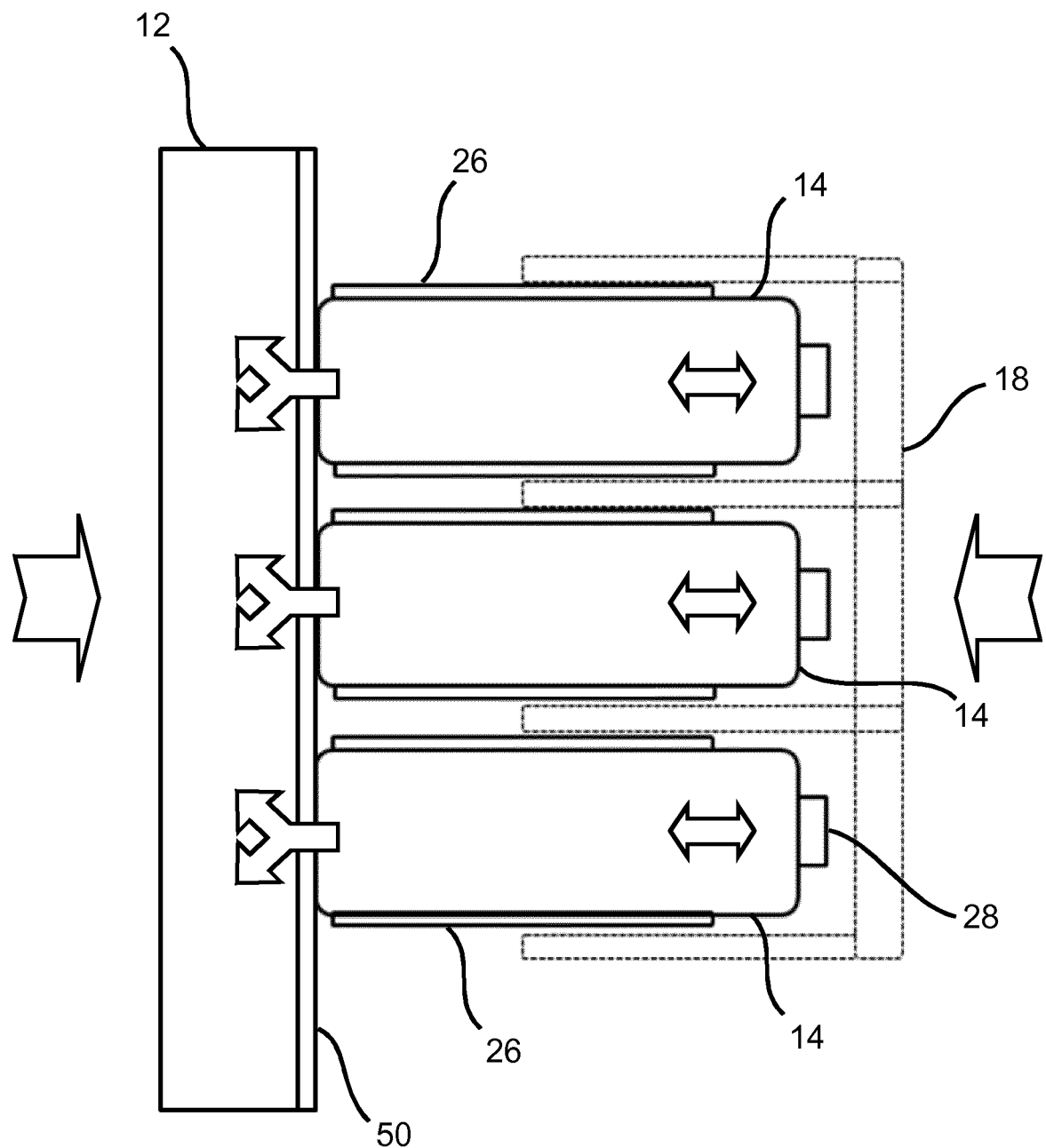
FIG. 16 shows an illustration for showing heat transfer from the accumulator cells to a housing of the accumulator module.

The illustration in FIG. 16 is similar to the illustration in FIG. 6, except that depiction of the one-side contacting, which is the primary focus in the illustration in FIG. 6, has been omitted. However, the one-side contacting, in particular the one-side contacting according to FIG. 6, 7, or 8, is still present, so that reference is made to the preceding description to avoid unnecessary repetitions.

The same as for the illustration in FIG. 6, multiple accumulator cells 14 placed in a carrier 18 are shown. The accumulator cells 14 are axially fixed in the carrier 18 or by means of the carrier 18, in particular by means of the one-side contacting described above. The accumulator cells 14 are oriented in parallel to one another along their longitudinal axes. For a carrier 18 corresponding to the embodiment described here, this parallel orientation of the accumulator cells 14, held on only one side, is achieved by long guiding by means of the journals 22 and/or the edge 20 of the carrier 18. Long guiding refers to the fact that the effective length of the journals 22 and/or of the edge 20, as the support surface, corresponds to at least approximately one-third of the length of the accumulator cells 14; an embodiment with a greater effective length is also possible.

The free ends of the accumulator cells 14 of the or a carrier 18, contacted from one side, protrude beyond the carrier 18, and the end faces at that location all point in the same direction, namely, in the direction toward an inner surface of a side wall of the housing 12. The end faces are likewise parallel to one another and parallel to the inner surface of the housing 12. All end faces lie in one plane or at least essentially in one plane. The accumulator cells 14 rest with these end faces either directly against the inner surface of the housing 12, or indirectly against the inner surface of the housing 12, on an electrical insulator 50 mounted flatly on the inner surface of the housing 12. The insulator 50 is optionally a highly thermally conductive insulator 50, for example an insulator 50 in the form of an acrylic film or a film made of aluminum oxide. Such a film is, for example, a film having a small thickness, for example a thickness of 0.2 mm to 0.3 mm.

In this form of heat transfer to the housing 12, electrically conductive contacting of the type described above, namely, the one-side contacting by means of cell connectors 16 with resilient contact tongues 46 and likewise resilient contact tabs 48, has proven to be particularly advantageous; accordingly, in one preferred embodiment it is provided that for the heat transfer to the housing, the accumulator cells 14 are mechanically retained in the manner described above with an emphasis on the electrical contacting. Namely, the mechanical retention by means of the contact tongues 46 and the contact tabs 48 ensures axial fixing of the accumulator cells 14 in the sense that each accumulator cell 14 is securely held in the carrier 18 and is clamped, in a manner of speaking, by means of the contact tongues 46 and the contact tabs 48. Due to the resilient elasticity of the contact tongues 46 and the contact tabs 48, however, a certain axial movability is maintained. This axial movability applies for each individual accumulator cell 14, and is present independently of all other accumulator cells 14 in the same carrier 18. This axial movability ensures that all free end faces of the accumulator cells 14 placed in a carrier 18 rest against the inner surface of the housing 12 or the insulator 50 mounted at that location. This ensures that each individual accumulator cell 14 takes part in the heat release to the housing 12.

For simplification, this situation may be considered as a plurality of mutually parallel coil springs that are mounted on a shared base plate and oriented normal to the plane of the base plate in the longitudinal direction. The base plate corresponds to the carrier 18 of the accumulator module 10 according to the invention. Each coil spring corresponds to an accumulator cell 14 of the accumulator module 10 according to the invention. The free ends of the coil springs correspond to the free ends of the accumulator cells 14. When an additional plate is pressed onto the free ends of the coil springs, at some point this results in a position, depending on the applied pressure, in which the free ends of all coil springs are in contact with the additional plate. This is the situation in which the free end faces of the accumulator cells 14 are in contact with the inner surface of the housing 12 or the insulator 50 mounted thereon.

Thus, it is important to note that particularly efficient heat transfer to the housing 12 is achievable when the accumulator cells 14 are resiliently supported, so that all accumulator cells 14 in a carrier 18 are independently axially movable to some extent, although they are basically axially fixed in the carrier 18. The contact tongues 46 and contact tabs 48 are only one example, and represent one possible embodiment of such resilient support.

FIG. 16 shows this resilient axial movability of the accumulator cells 14 in the carrier 18 and relative to the carrier 18 by means of the block arrows on both sides. The forked block arrows show the heat transfer from an accumulator cell 14 in each case to the housing 12, and illustrate that the thermal energy transferred into the housing 12 is distributed at that location according to physical laws, so that, instead of the comparatively small end faces of the accumulator cells 14, the significantly larger surface of the housing 12 or of a respective side surface of the housing 12 is effective for dissipating heat from the accumulator cells 14. The block arrow shown next to the carrier 18 and pointing in the direction of the housing 12, and the block arrow shown next to the housing 12 and pointing in the direction of the carrier 18 and the accumulator cells 14 placed therein, illustrate that for maintaining the thermal contacting of the housing 12, either the carrier 18 together with the accumulator cells 14 placed therein is moved in the direction of the particular side wall of the housing 12, or the housing 12 or its side wall is moved in the direction of the accumulator cells 14 placed in the carrier 18.

Such a movement of a carrier 18 together with the accumulator cells 14 combined therein takes place by means of at least one spacer piece 24 (FIG. 2), it being assumed in the embodiment shown in FIG. 2 that the housing 12 accommodates two equipped carriers 18 in which the free ends of the accumulator cells 14 placed therein point in opposite directions. Accordingly, the or each spacer piece 24 is inserted between the two carriers 18 after they have been simultaneously or successively placed in the housing 12. Inserting the or each spacer piece 24 between the two carriers 18 increases the distance between the carriers 18 (function of the spacer piece 24 as a spreading element), so that the carriers are pressed by the or each spacer piece 24 in the direction of the respective opposite side surface of the housing 12. As a result of this displacement, the free end faces of the accumulator cells 14 ultimately come into contact with the inner surface of the particular side wall of the housing 12 or an insulator 50 mounted at that location, and the desired thermal contacting of the housing 12 is provided.

Figure 17:
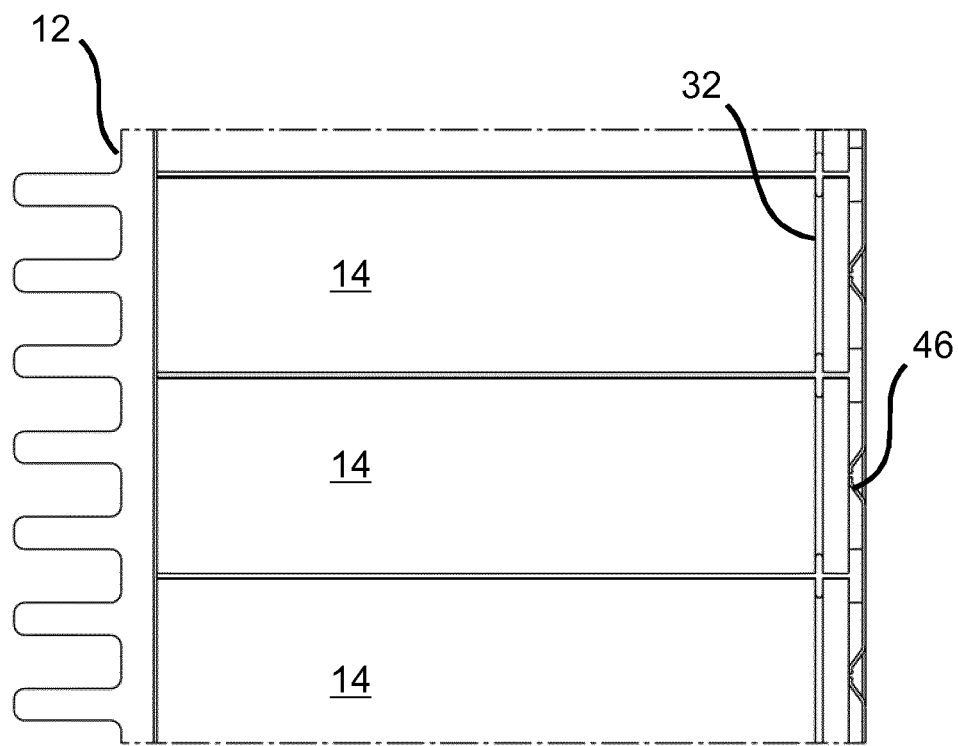
FIG. 17 shows a detail of an illustration with accumulator cell end faces resting against the inner surface of a side wall of the housing of the accumulator module.

The illustration in FIG. 17 shows an enlarged detail of a portion of the housing 12 according to FIG. 2, with the cooling ribs that are optionally present on the outer surface of the housing 12, as well as individual accumulator cells 14 that are pressed against the inner surface of the shown side wall of the housing 12 by means of a carrier 18, being visible. The mentioned resilient axial movability of the accumulator cells 14 is provided by the contact tongues 46 pressing onto the center contact 28, and by the contact tabs 48 engaging with the constriction 32.

The heat release from the housing 12 to the surroundings may be further assisted by optional additional heat dissipation from the housing 12. For example, cooling by means of a fluid that flows through cooling channels is suitable in this regard. The cooling channels extend at least in the side walls of the housing 12 that are thermally contacted by the accumulator cells 14 and/or in cooling ribs optionally present at that location, wherein a deflection of one cooling channel into a subsequent cooling channel takes place, for example, via a corresponding front and rear side surface.

In addition to the heat dissipation of the accumulator cells 14 described above, controlled heating of the accumulator cells 14 may also take place, for example at low temperatures and with accompanying unfavorable aging behavior of the accumulator cells 14, when the accumulator cells thermally contact the inner surface of a side surface of the housing 12 or an insulator 50 mounted at that location, in the manner described above. The housing 12 or the or each relevant side surface is then heated, for example electrically or by means of a heated fluid that flows through cooling channels in the housing 12.

Although the invention has been illustrated and described in greater detail with reference to the exemplary embodiment, the invention is not limited to the disclosed example (s), and other variations may be derived therefrom by those skilled in the art without departing from the protective scope of the invention.

Individual key aspects of the description provided herein may thus be briefly summarized as follows: The invention relates to an accumulator module 10 having optimized heat dissipation, namely, an accumulator module 10 having at least one carrier 18 that is placeable in the interior of a housing 12 of the accumulator module 10 and providable with a plurality of accumulator cells 14, wherein each accumulator cell 14 in the carrier 18 is electrically contacted solely from one side, and wherein the or each carrier 18 that is equipped with accumulator cells 14 is placeable in the interior of the housing 12 in a form that thermally couples the free end faces of the accumulator cells 14 to the housing 12, and is placed when an accumulator module 10 is in operation.

LIST OF REFERENCE NUMERALS 10 accumulator module
12 housing
14 accumulator cell
16 cell connector
18 carrier
20 edge (of the carrier)
22 journal (on the carrier)
24 spacer piece
26 insulation (of an accumulator cell)
28 end face-side contact/center contact (of an accumulator cell)
30 circumferential surface (of an accumulator cell)
32 constriction (in the circumferential surface of an accumulator cell)
34 (not assigned)
36 terminal tab
38 terminal tab
40 horizontal section (on the cell connector)
42 vertical section (on the cell connector)
44 lateral section (on the cell connector)
46 contact tongue (on the cell connector)
48 contact tab (on the cell connector)
50 insulator

The invention claimed is:

1. An accumulator module (10), comprising:
   a metallic housing (12) comprising four sides enclosing a cavity;
   at least one carrier (18) that is placed in the interior of the cavity of the metallic housing (12) and is fitted with a plurality of accumulator cells (14) each comprising a free end face,
   a plurality of evenly spaced cell connectors (16) oriented in parallel with one another being part of the carrier (18), wherein the plurality of cell connectors (16) each comprises resilient tongues (46) and contact tabs (48), wherein:
   each accumulator cell (14) in the carrier (18) is electrically contacted on only one side and the at least one carrier (18) fitted with accumulator cells (14) is placed in the interior of the cavity of the metallic housing (12) in a form that thermally couples the free end faces of the accumulator cells (14) to the metallic housing (12), and each accumulator cell (14) is individually axially resiliently mounted in the carrier (18), and
   the resilient tongues of one of the plurality of cell connectors and the contact tabs of another one of the plurality of cell connectors (14) contact each accumulator cell (14) to thereby apply axial bias to the respective accumulator cell (14) to individually axially resiliently mount the respective cell connector (16) in the carrier (18).

2. The accumulator module (10) according to claim 1, wherein the free end faces of the accumulator cells (14) which are electrically contacted on only one side protrude beyond the carrier (18) and point in the same direction, and wherein the free end faces of the accumulator cells (14) are located in one plane or at least essentially in one plane.

3. The accumulator module (10) according to claim 2, wherein two carriers (18) fitted with accumulator cells (14) can be secured in the metallic housing (12) by means of at least one spacer (24), and wherein the free end faces of the accumulator cells (14) that are placed in the carriers (18) abut the inner surface of the metallic housing 12 in order to dissipate heat to the metallic housing (12).

4. The accumulator module (10) according to claim 2, comprising an insulator (50) between the free end faces of the accumulator cells (14) and an inner surface of the metallic housing (12), wherein, in order to thermally couple the free end faces of the accumulator cells (14) to the metallic housing (12), the free end faces of the accumulator cells (14) abut the insulator (50) and the insulator (50) is in turn connected to the inner surface of the metallic housing (12).

5. The accumulator module (10) according to claim 4, wherein the insulator (50) is in the form of an insulator film attached to the inner surface of at least one lateral face of the metallic housing (12).

6. The accumulator module (10) according to claim 1, wherein, in a stepped profile, each cell connector (16) has a horizontal portion (40), an adjoining vertical or at least essentially vertical portion (42) and a lateral portion (44) which in turn adjoins said vertical portion, and wherein the contact tongues (46) are part of the horizontal portion (40) and the contact tabs (48) are part of the lateral portion (44).

7. The accumulator module (10) according to claim 1, wherein the accumulator cells (14) have a constriction (32) in a lateral surface (30) thereof, and wherein the contact tabs (48) engage in the constrictions (32) of the accumulator cells (14).

8. The accumulator module (10) according to claim 1, comprising a metallic housing (12) that is externally provided with cooling fins at least on one lateral face.

9. The accumulator module (10) according to claim 1, comprising a metallic housing (12) that has cooling channels through which a fluid can flow.

10. An electrical device comprising at least one accumulator module (10) according to claim 1.

11. The accumulator module (10) according to claim 1, wherein each cell connector (16) electrically conductively contacting the accumulator cells (14) to carry current between accumulator cells (14) of adjacent groups of accumulator cells (14), wherein each cell connector (16) has an elongated body that electrically conductively contacts the end-face contacts (28) of a plurality of accumulator cells (14) in a first group to the lateral surfaces (30) of a plurality of other accumulator cells (14) in a second group.

12. The accumulator module (10) according to claim 11, wherein each cell connector (16) comprises a plurality of contact sections each comprising at least one contact tongue (46) contacting the end-face contact (28) of a corresponding accumulator cell (16) in the first group and at least one contact tab (48) contacting the lateral surface (30) of a corresponding accumulator cell (16) in the second group.

13. The accumulator module (10) according to claim 12, wherein, in a stepped profile, each contact section of each cell connector (16) has a horizontal portion (40), an adjoining vertical or at least essentially vertical portion (42) and a lateral portion (44) which in turn adjoins said vertical portion, and wherein at least one contact tongue (46) is part of the horizontal portion (40) and at least one contact tab (48) is part of the lateral portion (44).

14. The accumulator module (10) according to claim 1, wherein a plurality of evenly spaced cell connectors (16) oriented in parallel with one another is part of a carrier (18), wherein each cell connector (16) electrically contacts positive terminals of a corresponding row of accumulator cells (14), but does not electrically contact negative terminals of said corresponding row of accumulator cells (14).

15. The accumulator module (10) according to claim 14, wherein each accumulator cell (14) is individually axially resiliently mounted in the carrier (18) in contact with a resilient contact tongue (46) of one cell connector (16) and a contact tab (48) of another cell connector (16).

16. An accumulator module (10), comprising:
a metallic housing (12) comprising four sides enclosing a cavity;
at least one carrier (18) that is placed in the interior of the cavity of the metallic housing (12) and is fitted with a plurality of accumulator cells (14) each comprising a free end face; and
a plurality of evenly spaced cell connectors (16) oriented in parallel with one another,
wherein:
each accumulator cell (14) in the carrier (18) is electrically contacted on only one side and the at least one carrier (18) fitted with accumulator cells (14) is placed in the interior of the cavity of the metallic housing (12) in a form that thermally couples the free end faces of the accumulator cells (14) to the metallic housing (12), and each accumulator cell (14) is individually axially resiliently mounted in the carrier (18),
each cell connector (16) has an elongated body that electrically conductively contacts the end-face contacts (28) of a plurality of accumulator cells (14) in a first group to the lateral surfaces (30) of a plurality of other accumulator cells (14) in a second group, and
each cell connector (16) comprises a plurality of contact sections (40, 42, 44) each comprising at least one contact tongue (46) contacting the end-face contact (28) of a corresponding accumulator cell (14) in the first group and at least one contact tab (48) contacting the lateral surface (30) of a corresponding accumulator cell (14) in the second group,
the plurality of contact sections (40, 42, 44) of the cell connector (16), each including the tongue (46) and the contact tab (48), are in one piece,
each accumulator cell (14) in the first group is conductively contacted by two, separate, cell connectors (16), and
the end-face contact (28) of each accumulator cell (14) in the first group is conductively contacted by a corresponding contact tongue (46) of one of the two cell connectors (16), and the lateral surface (30) of each accumulator cell (14) in the same first group is conductively contacted by a corresponding contact tab (48) of another one of the two cell connectors (16).

17. The accumulator module (10) according to claim 16, wherein a plurality of evenly spaced cell connectors (16) are oriented in parallel with one another is part of a carrier (18),
wherein each accumulator cell (14) is individually axially resiliently mounted in the carrier (18) by means of both the at least one contact tongue (46) of one cell connector (16) and the at least one contact tab (48) of another cell connector (16), each contacting an accumulator cell (14), and wherein the at least one contact tongue (46) and the at least one contact tab (48) being resilient.

* * * * *